US012561796B2

(12) United States Patent
Nadin Pinheiro et al.

(10) Patent No.: US 12,561,796 B2
(45) Date of Patent: Feb. 24, 2026

(54) ROOM ITEM MONITORING

(71) Applicant: Hewlett-Packard Development Company, L.P., Spring, TX (US)

(72) Inventors: Endrigo Nadin Pinheiro, Spring, TX (US); Christopher C. Mohrman, Spring, TX (US); Nick Sutton, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 302 days.

(21) Appl. No.: 18/040,373

(22) PCT Filed: Sep. 23, 2020

(86) PCT No.: PCT/US2020/052340
§ 371 (c)(1),
(2) Date: Feb. 2, 2023

(87) PCT Pub. No.: WO2022/066153
PCT Pub. Date: Mar. 31, 2022

(65) Prior Publication Data
US 2023/0274412 A1     Aug. 31, 2023

(51) Int. Cl.
G06T 7/00          (2017.01)
G06K 7/10          (2006.01)
G06Q 10/087        (2023.01)
G06Q 10/1093       (2023.01)
G06V 20/52         (2022.01)

(52) U.S. Cl.
CPC .......... *G06T 7/001* (2013.01); *G06K 7/10099* (2013.01); *G06Q 10/087* (2013.01); *G06Q 10/1093* (2013.01); *G06V 20/52* (2022.01)

(58) Field of Classification Search
USPC ....................................................... 382/103
See application file for complete search history.

(56) References Cited

U.S. PATENT DOCUMENTS

| | | | |
|---|---|---|---|
| 9,064,219 B2 | 6/2015 | Hall et al. | |
| 9,459,755 B2 | 10/2016 | Curtis | |
| 9,642,219 B2 | 5/2017 | Mead et al. | |
| 9,852,388 B1 * | 12/2017 | Swieter ........... | G06Q 10/06313 |

(Continued)

FOREIGN PATENT DOCUMENTS

| | | |
|---|---|---|
| CN | 103824407 A | 5/2014 |
| CN | 104025140 A | 9/2014 |

(Continued)

*Primary Examiner* — Jacky X Zheng
(74) *Attorney, Agent, or Firm* — Quarles & Brady LLP

(57) ABSTRACT

An example electronic device includes a memory. An electronic list of baseline items and a description of an arrangement of the baseline items associated with a room are stored in the memory. The baseline items and the description of the arrangement of the baseline items are generated based on room usage information and a classification of an individual using the room. A camera is provided to capture a digital profile of the room. The digital profile includes a stock of items and an arrangement of the items monitored in the room. A processor is communicatively linked to the camera. The processor is to compare the digital profile to the electronic list and generate an alert when the digital profile is different than the electronic list.

20 Claims, 14 Drawing Sheets

(56)     References Cited

U.S. PATENT DOCUMENTS

2009/0063306 A1      3/2009 Fano et al.
2013/0088591 A1      4/2013 Backlund
2016/0335731 A1    11/2016 Hall
2016/0364617 A1 *  12/2016 Silberschatz ........ G06V 40/103
2017/0236081 A1      8/2017 Grady Smith et al.
2018/0349832 A1    12/2018 Carbonell et al.
2019/0394614 A1    12/2019 Deluca et al.

FOREIGN PATENT DOCUMENTS

TW              436735 B      5/2001
WO      2001/015080 A2      3/2001

* cited by examiner

ELECTRONIC DEVICE 10, 100

Device
215

220

Processor
50

205

MACHINE-READABLE STORAGE MEDIUM

255
Implement a computerized machine learning method

260
Compare the digital profile to the electronic list

265
Determine whether the replacement items or the rearrangement of the items are needed in the room 270
Determine whether the electronic list is to be updated

210

200

ROOM ITEM MONITORING

BACKGROUND

Rooms, such as conference rooms in offices, can contain various objects or items to help conduct meetings. These items often have a designated place where they are positioned to prepare the room for subsequent meetings. Items may have to be replaced or reset after use.

BRIEF DESCRIPTION OF THE DRAWINGS

The following detailed description references the drawings, in which:

FIG. 5A is a schematic diagram illustrating the electronic device of FIG. 1 capturing a digital profile of a room to create an electronic model room profile, according to an example.

FIG. 5B is a schematic diagram illustrating the electronic device of FIG. 1 capturing a digital profile of a room to compare with an electronic model room profile, according to an example.

Throughout the drawings, identical reference numbers designate similar, but not necessarily identical, elements.

Figure 1:
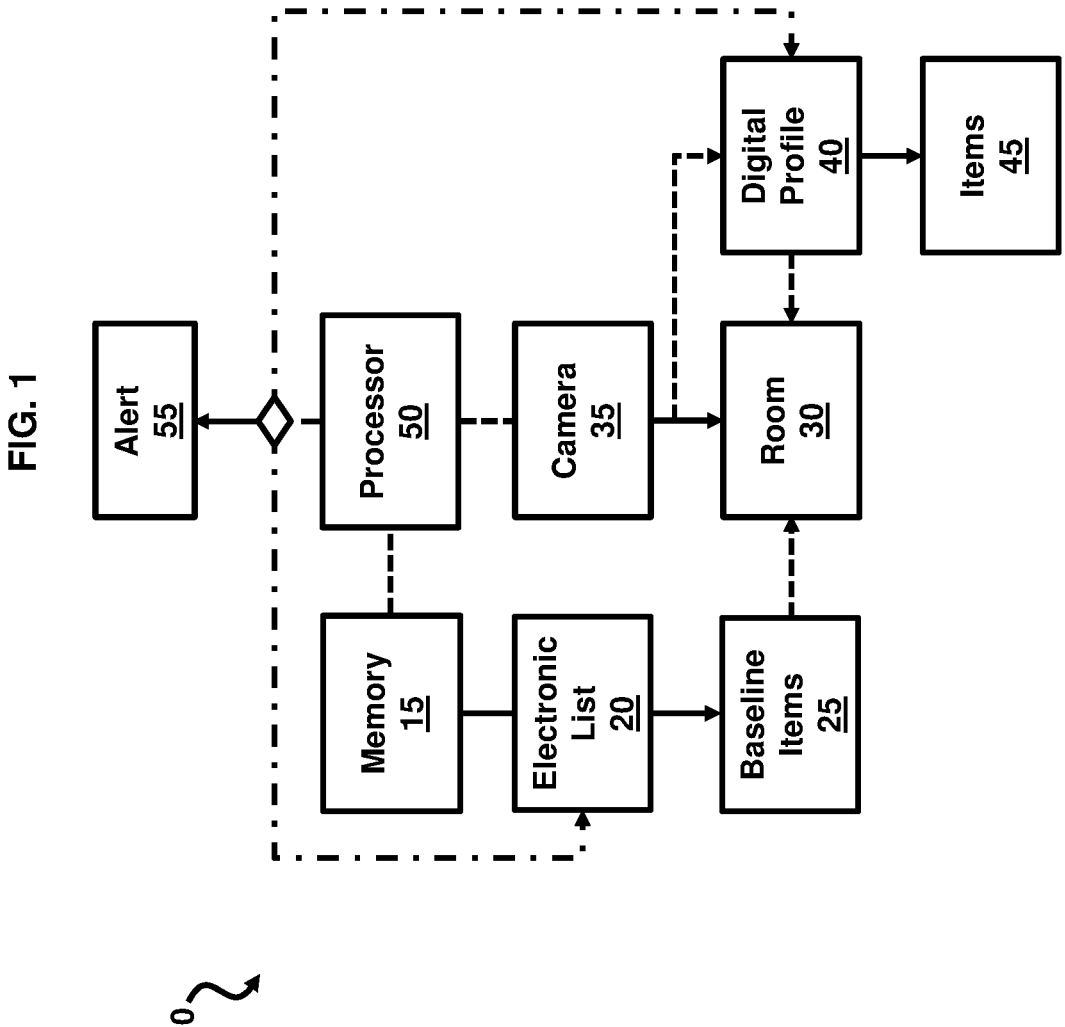
FIG. 1 is a block diagram illustrating an electronic device that uses a digital profile to monitor a room, according to an example.

The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Managing real state and office supply inside a workplace may be a costly process and prone to inefficiency. The task of checking every meeting room's office supply of items, such as markers, whiteboard, eraser, cleanliness, arrangement of chairs etc. can be tedious and demanding, particularly in offices with multiple rooms located on multiple floors. Rooms that are unorganized or lack sufficient supplies to properly conduct a meeting can affect the productivity in the workplace, as well as motivation and mood in an organization. An individual such as a maintenance worker, administrator, office attendant, assistant, intern, or janitor, etc. may be tasked to check the status of a conference room in an office building to determine whether the room is clean and in condition to conduct a meeting. This may be a long and inefficient process in an office containing dozens of conference rooms because it may require the individual to go from room to room several times a day. Moreover, such an individual may not necessarily know how best to reset a particular room for an upcoming meeting or where the items in that room belong. Therefore, an electronic or computing device is provided that utilizes a camera to capture images and/or video of a room, such as a conference room to check for the status of inventory for that particular room, such as markers, pens, chairs, cups, etc. and sends alerts to a centralized management program whenever replenishments for the inventory items are necessary or when other aspects of the room require attention such as chair placement, trash removal, etc.

According to an example, an electronic device is provided comprising a memory. An electronic list of baseline items and a description of an arrangement of the baseline items associated with a room are stored in the memory. The baseline items and the description of the arrangement of the baseline items are generated based on room usage information and a classification of an individual using the room. A camera is provided to capture a digital profile of the room. The digital profile comprises a stock of items and an arrangement of the items monitored in the room. A processor is communicatively linked to the camera. The processor is to compare the digital profile to the electronic list; and generate an alert when the digital profile is different than the electronic list. The digital profile may comprise a digital image of the room, a digital video of the room, or a combination thereof. The electronic device may comprise a microphone communicatively linked to the processor and the camera. The microphone is to capture audio from the room. The electronic list comprises audio instructions to trigger the alert. The processor is to compare the captured audio from the room with the electronic list to determine whether the alert is to be generated. The electronic device may comprise a sensor communicatively linked to the processor and the camera. The sensor is to detect an environmental condition of the room. The electronic list comprises a baseline environmental condition of the room. The processor is to compare the detected environmental condition with the baseline environmental condition to determine whether the alert is to be generated. The processor, the microphone, the sensor, or a combination thereof is to trigger the camera to capture the digital profile of the room.

Another example provides an electronic device comprising a camera to capture a digital image of a room. The digital image comprises a stock of items and an arrangement of the stock of items monitored in the room. A sensor is communicatively linked to the camera. The sensor is to detect movement within the room and trigger the camera to capture the digital image of the room based on the detected movement. A memory is communicatively linked to the camera. The memory comprises a baseline image of baseline items associated with the room. A processor is communicatively linked to the memory, the camera, and the sensor. The processor is to perform image recognition analysis of the digital image by comparing the digital image to the baseline image. The image recognition analysis comprises assigning an electronic marker to the baseline items and determining whether the electronic marker is found in the digital image. The processor is to transmit an alert when the image recognition analysis detects differences between the digital image and the baseline image which exceed a threshold difference level. The sensor is to transmit a signal to the processor to compare the digital image to the baseline image based on the detected movement to determine whether the alert is to be transmitted. The sensor is to detect the movement of the stock of items and the arrangement of the stock of items located in the room by detecting a radio frequency identification (RFID) tag attached to the stock of items and detecting a change in a location of the RFID tag compared with a previous detection of the RFID tag. The electronic device may comprise task scheduler machine readable instructions executed by the processor upon the processor transmitting the alert, wherein the task scheduler machine readable instructions is to create an electronic ticket to reset the stock of items and the arrangement of the stock of items located in the room to align with the baseline items associated with a room. The electronic device may comprise electronic purchasing machine readable instructions executed by the processor, wherein the task scheduler machine readable instructions is to transmit an executable command to the electronic purchasing machine readable instructions to determine an amount of replacement items available for resetting the room, and to automatically purchase the replacement items when the amount of the replacement items is below a threshold inventory level.

Another example provides a machine-readable storage medium comprising computer-executable instructions that when executed cause a processor communicatively linked to an electronic device to establish an electronic model room profile comprising an electronic list of baseline items and a description of an arrangement of the baseline items associated with a room; and receive a digital profile of the room. The digital profile comprises a digital image, a digital video, or a combination thereof of a stock of items and an arrangement of the items monitored in the room. The processor is to compare the digital profile to the electronic list by detecting whether differences in the digital profile and the electronic list exceed a threshold difference level based on a quality of the differences; and generate an alert when the threshold difference level has been met. The alert comprises instructions whether replacement items or a rearrangement of the items are needed in the room based on the electronic model room profile.

The instructions, when executed, further cause the processor to review a calendar system to determine a meeting status associated with the room. The meeting status comprises (i) a past meeting, (ii) a current meeting, (iii) a future meeting scheduled for the room, (iv) a number and identification of attendees associated with the past meeting, the current meeting, and the future meeting, (v) a purpose of the past meeting, the current meeting, and the future meeting, or (vi) a combination thereof. The processor is to update the electronic model room profile based on the meeting status. The instructions, when executed, further cause the processor to implement a computerized machine learning model to analyze the digital profile and the electronic model room profile; compare the digital profile to the electronic list; determine whether the replacement items or the rearrangement of the items are needed in the room based on the meeting status; and determine whether the electronic list is to be updated based on the comparison of the digital profile to the electronic list and the update to the electronic model room profile.

The instructions, when executed, further cause the processor to identify a trigger point in the electronic model room profile. The trigger point comprises changes to the stock of items and the arrangement of the items located in the room, a time parameter, movement in the room, an environmental condition in the room, scheduled use of the room, or a combination thereof. The processor is to compare the digital profile with the electronic model room profile to determine whether a trigger point has occurred; receive a second digital profile of the room upon an occurrence of the trigger point; and compare the second digital profile with the electronic model room profile to determine whether a second trigger point has occurred. The instructions, when executed, further cause the processor to transmit audio to be broadcast in the room. The audio comprises instructions for replacing items or rearranging the items in the room in order to conform to the electronic model room profile.

FIG. 1 illustrates an electronic device 10 comprising a memory 15. The electronic device 10 may comprise any suitable size, shape, or configuration and may be a stand-alone device, a computer, a communication device, an appliance, a stationary device, or a movable device, according to various examples. Furthermore, the electronic device 10 may be powered using different techniques; i.e., battery or cord. Moreover, the electronic device 10 may be independently and automatically operated or may be operated or engaged by a remote device or system. The memory 15 may be Random Access Memory, Read-Only Memory, a cache memory, or other type of storage mechanism, according to some examples. An electronic list 20 of baseline items 25 and a description of an arrangement of the baseline items 25 associated with a room 30 are stored in the memory 15. In an example, the electronic list 20 may be a computerized list, image, video, or a combination thereof generated in a computer application program such as a data processing program, a spreadsheet program, a database program, or image and video processing program that creates lists and/or compiles data. In an example, the baseline items 25 comprise mechanical, electrical, optical, magnetic, or chemical items. For example, the baseline items 25 may be items found in a conference room such as a whiteboard, writing markers, computer, television, projector and projector screen, plants, drinking cups, pens, notepads, trash cans, water bottles, and office furniture, among other types of items. The description of the arrangement of the baseline items 25 associated with the room 30 reflect how the various items in a room 30 are to be positioned according to a protocol, which may be based on an office/organization policy, etc. Moreover, the position of the chairs and table in a room 30 along with the layout of the cups and water bottles may be examples of the arrangement of the baseline items 25 associated with the room 30. The baseline items 25 are indicative of what the various types of items in a room 30 would be and their corresponding position or arrangement in an undisturbed, orderly, and clean setting; i.e., when a room 30 has been cleaned and prepared for an upcoming meeting in the room 30. Moreover, the baseline items 25 and the arrangement of the baseline items 25 are established to provide a threshold of what constitutes a suitable environment for a particular room 30 given an office/organization policy, etc. The room 30 may be any type of room, meeting space, or area including closed or open areas. Moreover, the room 30 may be indoors or an outdoor space having a set boundary. For example, the room 30 may be a conference room that is found in an office setting. In other non-limiting examples, the room 30 may be a classroom, lecture hall, board room, lobby, office, bedroom, kitchen, bathroom, living room, study, museum hall, garage, store, restaurant, doctor's examination room, operating room, court room, or any other room, space, or area in a professional, retail, government, or home environment. For ease of explanation, the examples described herein reference a conference room setting for conducting meetings. However, these are merely non-limiting examples and other scenarios are possible. The electronic list 20 is a computerized compilation of the baseline items 25 and a description of the arrangement of the baseline items 25, which may be created by manually entering the data into the electronic list 20, or by capturing an initial image or video of the room 30 in its undisturbed setting to determine what the baseline items 25 are and the arrangement of the baseline items 25 in the room 30. In this regard, the electronic list 20 may be in the form of an image or video stored in the memory 15.

According to an example, the baseline items 25 and the description of the arrangement of the baseline items 25 may be generated based on room usage information and a classification of an individual using the room 30. According to an example, room usage information may include the purpose of using the room; i.e., whether the room 30 is to be used for a meeting, the type of meeting, the duration of the meeting, the number of individuals planning on attending the meeting, etc. In an example, a classification of an individual may include the position, level, experience, or a combination thereof held by the individual. For example, the classification of an individual may be director-level, executive-level, management-level, sales-level, junior-level, assistant-level, consultant-level, etc. The classification of an individual may change as an individual is promoted over time. Additionally, in an example, the room 30 may be used to conduct an office meeting with executive-level managers. Accordingly, the room 30 is to be in a very organized state prior to the meeting with sufficient items that are neatly arranged in a proper location in the room 30. In this regard, the purpose of the room 30 may be to conduct an executive-level meeting with individuals who are classified as being high-level or executive-level individuals. Conversely, the room 30 could be used as a babysitting space, which would be used by children. Accordingly, different rooms would have different baseline items 25 as well as a different arrangement of the baseline items 25.

A camera 35 may be used to capture a digital profile 40 of the room 30. In an example, the camera 35 may be a digital camera having any suitable resolution, a webcam, network camera, or other type of camera that may be embedded in the electronic device 10 or attached to the electronic device 10 and that may be used to capture images and/or video. Furthermore, the camera 35 may comprise any suitable arrangement of sub-components to house the electronics and optics to operate the camera 35. The camera 35 may previously capture an image and/or video of the room 30 to establish the baseline items 25 and the description of an arrangement of the baseline items 25, which are stored in the memory 15. Thereafter, the camera 35 may capture the digital profile 40 of the room 30 after a particular period of time. The digital profile 40 comprises a stock of items 45 and an arrangement of the items 45 monitored in the room 30. In an example, the digital profile 40 may be captured by the camera 35 automatically based on a set timing programmed into the logic circuitry of the camera 35, or the digital profile 40 may be captured by the camera 35 using remote instructions transmitted to the electronic device 10 from another location. The stock of items 45 may be the actual items 45 in the room 30 and captured by the camera 35. The arrangement of the items 45 may be how the stock of items 45 are positioned in the room and captured by the camera 35. In this regard, stock of items 45 and the arrangement of the items 45 may be the same or different from the baseline items 25 and a description of an arrangement of the baseline items 25 associated with a room 30. For example, when the stock of items 45 and the baseline items 25 are different, the stock of items 45 and the arrangement of the items 45 in the room may be a result of the condition of the room 30 after a meeting has been conducted therein. Accordingly, some of the stock of items 45 may be missing, used, or require replenishment. Additionally, the arrangement of the items 45 may have to be reset based on use of the room 30 by individuals who may have moved chairs, open cabinets, or doors, etc. In another example, when the stock of items 45 and the baseline items 25 are the same, it may be the result of the room 30 not being used or disturbed, or none of the stock of items 45 were used during a meeting, or all of the stock of items 45 are returned to their original positions or locations in the room 30 and at the same quantity or amount. Accordingly, the stock of items 45 and the baseline items 25 are substantially the same when compared.

A processor 50 is communicatively linked to the camera 35. The processor 50 may be a digital signal processor, media processor, microcontroller, microprocessor, embedded processor, or other suitable type of processor, according to some examples. In an example, the processor 50 may control the automatic operations of the camera 35 without the need of user intervention by programming the processor 50 with controlling instructions to operate the camera 35. The processor 50 is to compare the digital profile 40 to the electronic list 20. In this regard, the processor 50 is to compare the image and/or video of the stock of items 45 and the arrangement of the items 45 captured by the camera 35 with the baseline items 25 and the arrangement of the baseline items 25 provided in the electronic list 20. This comparison may occur, for example, using image recognition analysis that may perform a pixel-by-pixel comparison of an image of the baseline items 25 with an image of the stock of items captured by the camera 35 and presented in the digital profile 40. The processor 50 is to generate an alert 55 when the digital profile 40 is different than the electronic list 20. For example, when the image of the baseline items 25 and/or arrangement of the baseline items 25 is identified as being different from the image of the stock of items 45 and/or the arrangement of the items 45 during the image recognition analysis, then the processor 50 generates the alert 55. According to some examples, the alert 55 may be an electronic signal produced by the processor 50. Moreover, the alert 55 may be transmitted to a remote device, not shown, for further processing and/or for alerting a user that the digital profile 40 is different than the electronic list 20. Additionally, the indication of the occurrence of an alert 55 may be stored in a database in the memory 15 by timestamp identifiers for ongoing or future data analytics or use by a machine learning model. According to an example, the alert 55 may be transmitted to another remote device or system, not shown, that is remotely located from the electronic device 10 such that the remote device may alert a maintenance worker or other individual that resetting the stock of items 45 in the room 30 is required or a replenishment of the stock of items 45 in the room 30 is required.

Figure 2:
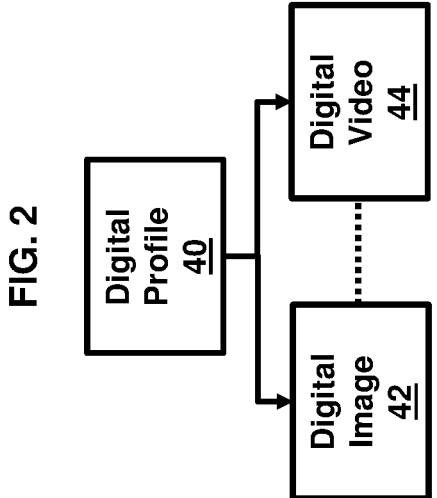
FIG. 2 is a block diagram illustrating aspects of the digital profile of the electronic device of FIG. 1, according to an example.

FIG. 2, with reference to FIG. 1, illustrates that the digital profile 40 comprises a digital image 42 of the room 30, a digital video 44 of the room 30, or a combination thereof. The digital image 42 or digital video 44 may be captured by the camera 35 as a series of images or videos, according to an example. In another example, the digital image 42 may be time elapsed based on a timing sequence programmed into the camera 35 or in the processor 50 for controlling the camera 35. The digital image 42 and/or digital video 44 of the room 30 may be stored locally in the camera 35 and accessed by the processor 50, and/or may be accessed by the processor 50 for storage in the memory 15 and retrieval by the processor 50 when performing the comparison of the digital profile 40 with the electronic list 20.

Figure 3:
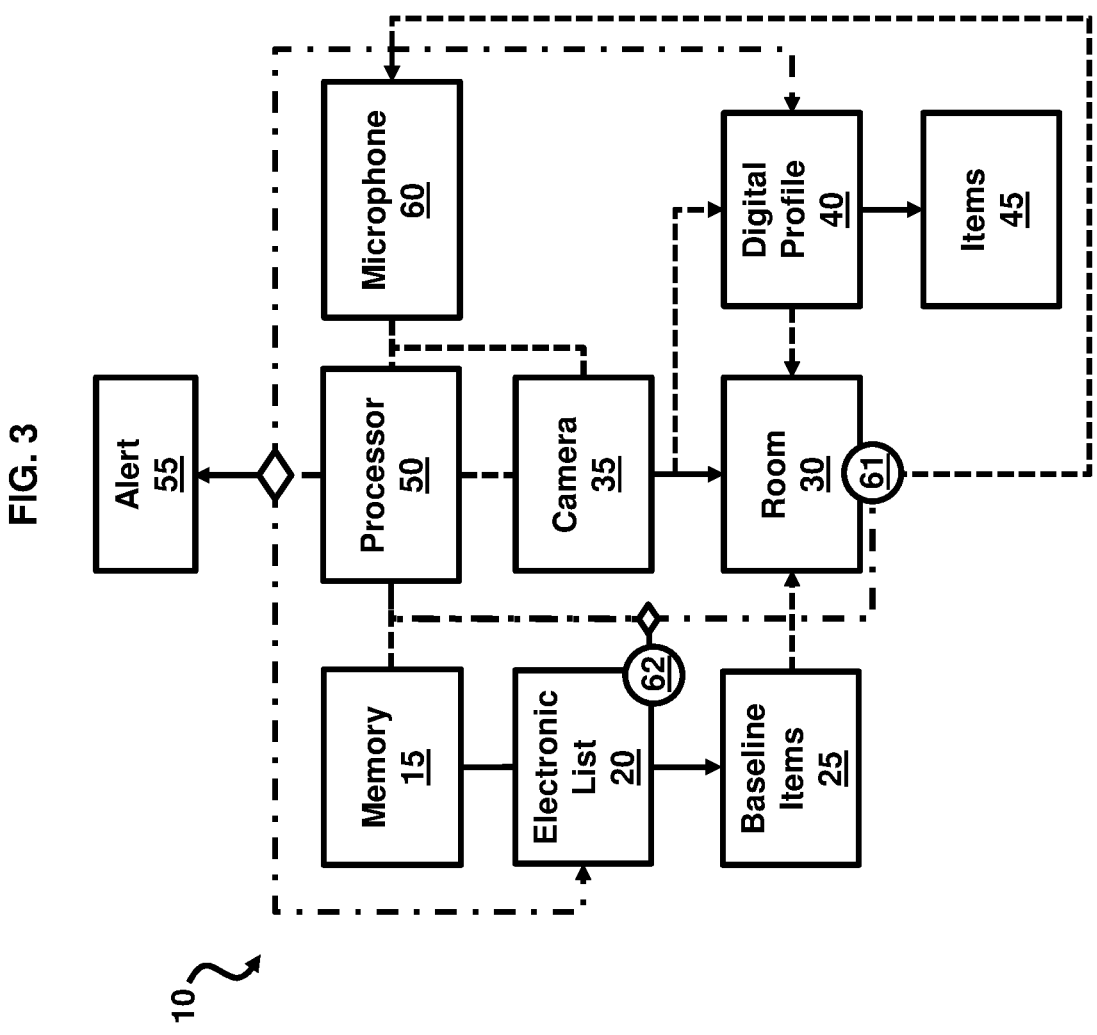
FIG. 3 is a block diagram illustrating the electronic device of FIG. 1 with a microphone to capture audio from a room, according to an example.

FIG. 3, with reference to FIGS. 1 and 2, illustrates that the electronic device 10 may comprise a microphone 60 communicatively linked to the processor 50 and the camera 35. In an example, the processor 50 may control the automatic operations of the microphone 60 without the need of user intervention by programming the processor 50 with controlling instructions to operate the microphone 60. In an example, the microphone 60 is to capture audio 61 from the room 30. For example, if a meeting is being conducted in the room 30 and audio 61 is being generated by the participants of the meeting and captured by the microphone 60, then the processor 50 may receive a signal from the microphone 60, and the processor 50 may then transmit instructions to the camera 35 to capture a digital profile 40 of the room 30. In this regard, the digital profile 40 of the room 30 may be captured at any time irrespective of whether the room 30 is in use; i.e., for a meeting, etc., or the room 30 does not contain any individuals. Additionally, the electronic list 20 comprises audio instructions 62 to trigger the alert 55. Accordingly, the audio instructions 62 may comprise a command to trigger the alert 55 upon the processor 50 executing the command. In an example, the processor 50 is to compare the captured audio 61 from the room 30 with the audio instructions 62 of the electronic list 20 to determine whether the alert 55 is to be generated. In this regard, the audio instructions 62 may include a programmed set of words or phrases, and when the audio 61 that is captured by the microphone 60 contains words or phrases that match the words or phrases in the audio instructions 62, then the processor 50 may trigger the alert 55. For example, in conducting a meeting, an individual may state "more water is needed in room C503." This audio 61 is captured by the microphone 60 and the processor 50 searches for words such as "more", "water", "needed", "room", and/or "C503" in the audio instructions 62 and if a threshold number of these words are found in the audio instructions 62, then the alert 55 is triggered. Accordingly, a maintenance worker or other individual may bring more water to the room 30. In another example, the room 30 may be equipped with smart appliances or equipment such as a smart thermostat, which may output audio 61 referencing the temperature of the room 30. Accordingly, the audio 61 may be compared with the audio instructions 62 to determine whether the temperature that is indicated by the smart thermostat is within a proper setting for the room 30. For example, the audio instructions 62 may contain a range of temperatures and if the indicated audio 61 indicates that the temperature of the room 30 is outside of the range of temperatures provided in the audio instructions 62, then the processor 50 identifies this difference and triggers the alert 55. Based on the alert 55, a maintenance worker or other individual may come to the room 30 to change the thermostat settings or may send an electronic command to the smart thermostat to change the settings remotely, etc.

Figure 4:
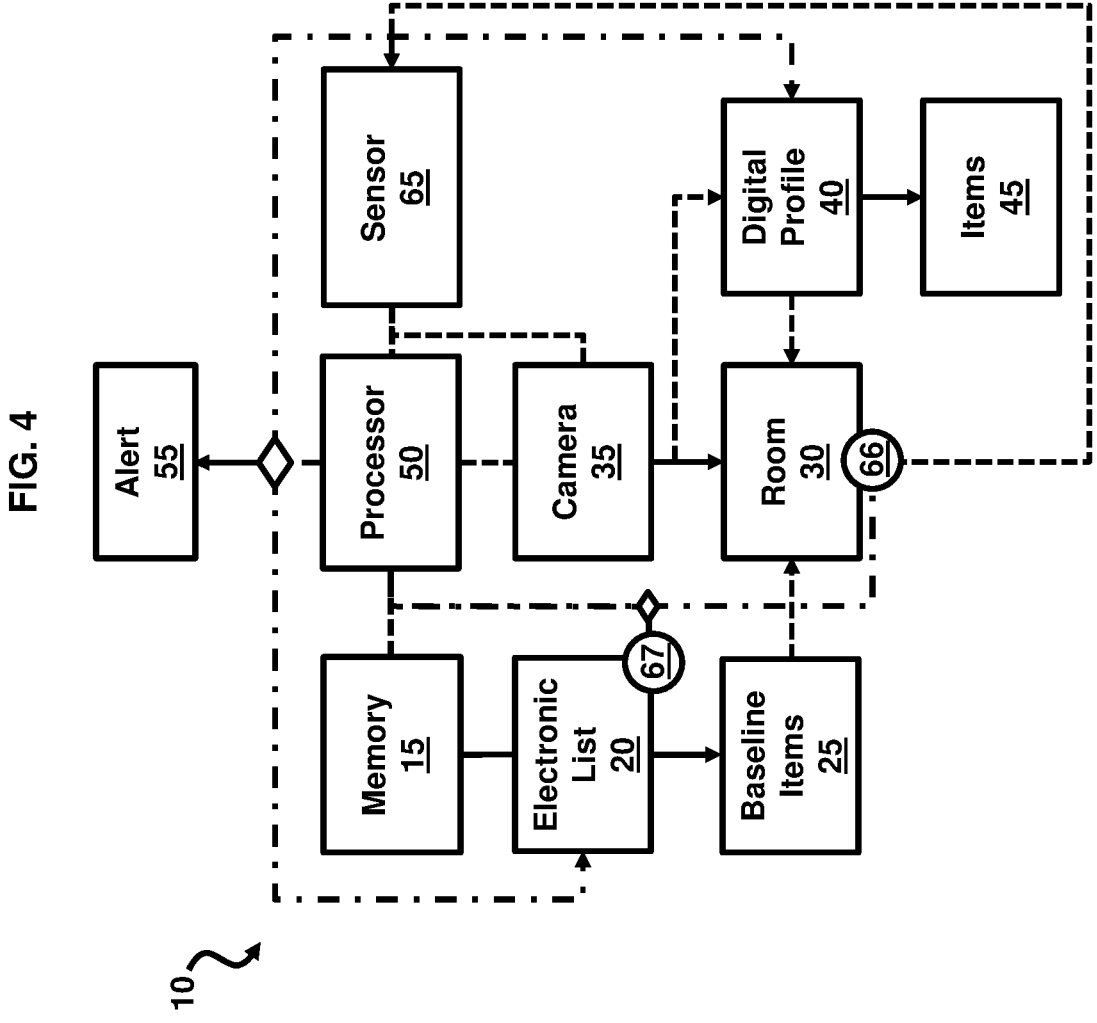
FIG. 4 is a block diagram illustrating the electronic device of FIG. 1 with a sensor to detect an environmental condition of a room, according to an example.

FIG. 4, with reference to FIGS. 1 through 3, illustrates that the electronic device 10 may comprise a sensor 65 communicatively linked to the processor 50 and the camera 35. In an example, the processor 50 may control the automatic operations of the sensor 65 without the need of user intervention by programming the processor 50 with controlling instructions to operate the sensor 65. According to some examples, the sensor 65 may comprise a mechanical sensor, electrical sensor, optical sensor, magnetic sensor, chemical sensor, or a combination thereof. Furthermore, the sensor 65 may be internal or external to the electronic device 10. The sensor 65 is to detect a current environmental condition 66 of the room 30. According to some examples, the current environmental condition 66 of the room 30 may include the temperature, humidity, lighting intensity, or a combination thereof, which are detectable by the sensor 65. Additionally, the electronic list 20 comprises a baseline environmental condition 67 of the room 30. According to some examples, the baseline environmental condition 67 of the room 30 may include a suitable range of the temperature, humidity, and/or lighting intensity, etc. which the room 30 is to contain, and which may be based on an organization's policy. Upon the sensor 65 sensing a detected environmental condition 66 of the room and transmitting the detected parameters to the processor 50, the processor 50 is to compare the detected environmental condition 66 with the baseline environmental condition 67 to determine whether the alert 55 is to be generated. For example, if the detected environmental condition 66 is the temperature of the room 30 and the detected temperature is outside of the range of temperatures provided in the baseline environmental condition 67, then the alert 55 is generated, and may be transmitted to a maintenance worker or other individual to come to the room 30 to change the temperature, etc.

According to an example, the processor 50, the microphone 60, the sensor 65, or a combination thereof is to trigger the camera 35 to capture the digital profile 40 of the room 30. In this regard, the processor 50, the microphone 60, and the sensor 65 may work independently or in combination with each other to trigger the operation of the camera 35. For example, when the microphone 60 captures audio 61 in the room 30, then the microphone 60 may directly transmit a signal to the camera 35 for the camera 35 to capture a digital image 42 of the room 30, a digital video 44 of the room 30, or a combination thereof. Similarly, when the sensor 65 senses a detected environmental condition 66 of the room 30, then the sensor 65 may directly transmit a signal to the camera 35 for the camera 35 to capture a digital image 42 of the room 30, a digital video 44 of the room 30, or a combination thereof. In this regard, the camera 35 may capture a heat map of the room 30 to determine whether there are hot spots in the room 30; e.g., due to a malfunctioning air vent, etc. Furthermore, the processor 50 may directly instruct the camera 35 to capture a digital image 42 of the room 30, a digital video 44 of the room 30, or a combination thereof with or without the occurrence of detected audio 61 by the microphone 60 and/or the detected environmental condition 66 by the sensor 65.

Figure 5A:
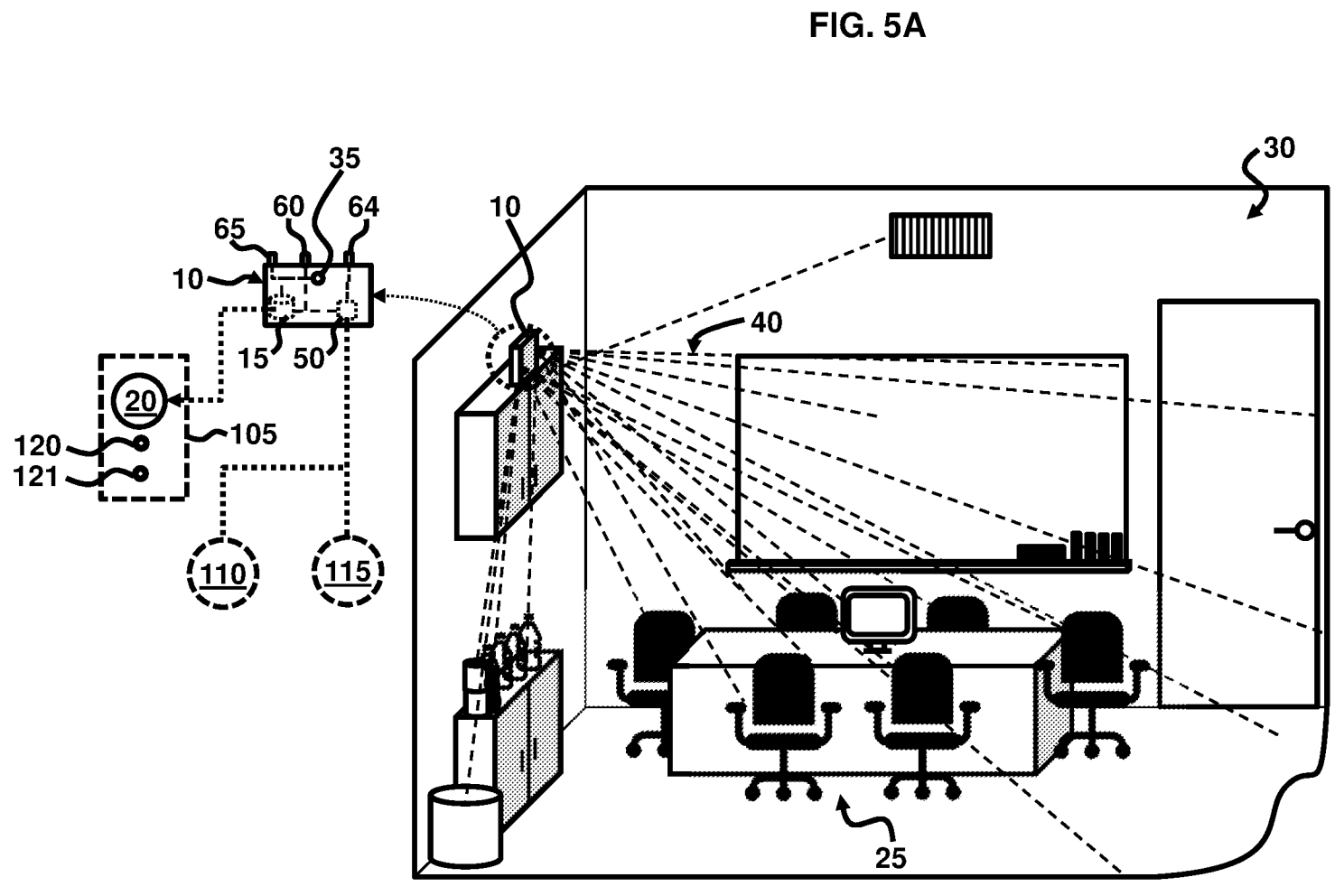

FIG. 5A, with reference to FIGS. 1 through 4, illustrates a schematic view of the electronic device 10 being used to monitor a room 30. While the electronic device 10 is shown to be positioned above a cabinet, this is merely an example, and accordingly the electronic device 10 may be positioned anywhere in the room 30 and at any height. In some examples, the electronic device 10 may be attached to the ceiling of the room 30, or positioned adjacent to the floor, or on a wall, etc. Moreover, the electronic device 10 may be stationary or movable, including rotatable. Furthermore, the electronic device 10 may be a standalone device or may be part of another device such as a computer system, appliance, monitor, television, etc. in the room 30. The electronic device 10 may first establish an electronic model room profile 105 that contains the electronic list 20. The electronic model room profile 105 may be stored in the memory 15 and retrieved by the processor 50 for comparison to a captured digital profile 40 of baseline items 25 and the arrangement of the baseline items 25 associated with a room 30. For example, the baseline items 25 for a conference room 30 shown in FIG. 5A may include items such as the contents of a whiteboard, whiteboard markers and an eraser, water bottles, coffee cups, contents of a trash can, etc. In an example, the arrangement of the baseline items 25 for the conference room 30 shown in FIG. 5A may include the position or arrangement of the furniture such as the chairs, desk/table, and the orientation of the room door and cabinet doors (i.e., open or closed), etc. The initial electronic model room profile 105 describes a layout of the room 30 in terms of the quantity of the baseline items 25 and the quality of the baseline items 25; i.e., clean. The electronic model room profile 40 may periodically change based on an ongoing analysis performed using a computerized machine learning model 115 to determine how the room 30 is being utilized and what the baseline items 25 are to be. For example, initially the computerized machine learning model 115 may be programmed with instructions that six water bottles are needed in the room 30 prior to a meeting to ensure that each individual has a water bottle because the room 30 contains six chairs and therefore, and the expectation is that only six individuals will be occupying the room at any given time. However, as meetings continue to occur in the room 30 over time, it may be learned that there are actually seven to ten individuals who occupy the room 30 for meetings and either these extra individuals remain standing or move around during the meeting to pass out materials to the other attendees or to write on the whiteboard or to move in/out of the room 30 to bring in additional materials necessary for the meeting, etc. Accordingly, the electronic model room profile 105 may be subsequently updated to indicate that there are to be at least ten water bottles as part of the baseline items 25 associated with the room 30. Another example may be the arrangement of the chairs in the room 30. The initial electronic model room profile 105 may consider that the arrangement of the baseline items 25 with respect to the positioning of the chairs is that the chairs are positioned around the table. However, the computerized machine learning model 115 may be trained over time where it is learned that in most meetings conducted in the room 30, the chairs are pushed against a back wall of the room 30; i.e., to allow individuals to view the whiteboard unobstructed and without having to turn around in their chairs, and the table is used to hold paper, food, or other materials.

After the electronic model room profile 105 is established and saved in the memory 15, the room 30 may be ready for use; i.e., for conducting a meeting, etc. For example, an organization may utilize a computerized calendar system 110 to organize reservation time(s) for individuals wishing to use the room 30. The electronic model room profile 105 may be updated to reflect saved reservations in the computerized calendar system 110. In some instances, a reservation may indicate that the room 30 is being reserved for senior-level managers of the organization. Accordingly, whenever a reservation includes use of the room 30 by senior-level individuals, then a trigger point 120 may be created indicating that the baseline items 25 of the room 30 or the arrangement of the baseline items 25 is different; i.e., additional water bottles, snacks, additional chairs, a lower room temperature, background music, etc. In an example, the trigger point 120 may be an electronic signal that is transmitted from the computerized calendar system 110 to the processor 50.

Figure 5B:
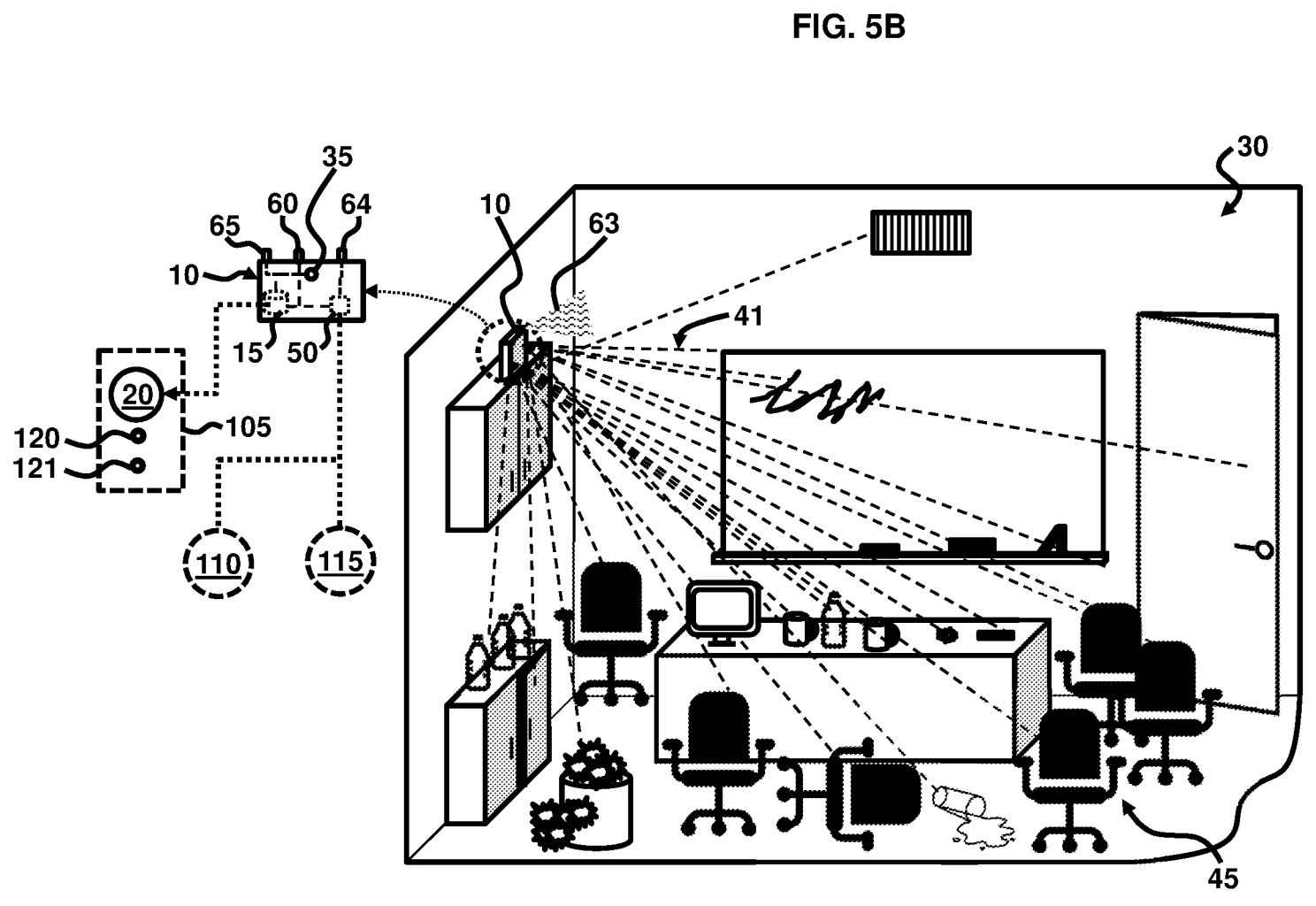

Thereafter, as shown in FIG. 5B, with reference to FIGS. 1 through 5A, after a meeting is conducted in the room 30, the camera 35 of the electronic device 10 may capture a second digital profile 41 of the room 30. In this regard, the stock of items 45; i.e., water bottles, trash, condition of the whiteboard, etc. and the arrangement of the items 45; i.e., location of the chairs, position of the door and cabinets, etc. may be captured in the second digital profile 41. Then, the processor 50 may compare the second digital profile 41 with the electronic model room profile 105 retrieved from memory 15 to determine whether the room 30 has to be cleaned and reorganized, and also to determine whether the stock of items 45 and the arrangement of the items 45 have to be replenished. In this regard, the processor 50 may once again communicate with the computerized calendar system 110 to determine when the next scheduled use of the room 30 is and whether, based on the type of use that is scheduled for the room 30, a second trigger point 121 is created to provide instructions for how the room 30 is to be presented for the next scheduled use. A maintenance worker or other individual may be in the room 30 to replenish the items 45 or reset the arrangement of the items 45 the room 30. Such an individual may require instructions as to how to reset the room 30 or how many of a particular type of items 45 are required. In this example, the electronic device 10 may broadcast audio 63; i.e., through a speaker 64 such that the audio 63 provides instructions for resetting the room 30 according to the electronic model room profile 105.

An example of how the machine learning model 115 may be trained and used with the electronic device 10 is as follows: Initially, the electronic device 10 is set for operation and the camera 35 is triggered to start learning the current environment of the room 30 in order to recognize and establish baseline items 25 in the room 30 and the disposition or arrangement of the baseline items 25 in the room 30. With a digital image 42 or digital video 44 initially captured, the processor 50 creates the electronic list 20 of the baseline items 25 and the associated attributes of the baseline items 25. For example, the attributes of the baseline items 25 in the room 30 may be the number of markers and the corresponding colors, assessing how white is the whiteboard to identify how dirty the whiteboard is, and the number of chairs and the arrangement of the chairs in the room 30, among several other attributes associated with the baseline items 25. With these attributes, the processor 50 creates the electronic list 20, which may be a computerized model for which future images or video will be compared against. This computerized model can also contain certain object-specific configurations such as: the type of allowed items 45 in the room, the maximum and minimum instances of a specific type of items 45 allowed in the room 30, and whether the count/number of a specific item reaches these thresholds. When thresholds are reached, the processor 50 can indicate an anomaly.

The electronic list 20 may have a trigger point 120 to trigger a subsequent image or video capturing of the items 45 in the room 30 by the camera 35. The trigger point 120 can be configured in different manners, by allowing the subsequent check to occur between every meeting, every x hours, or every day at a set time, for example. The check will detect the changes in the condition of the room 30 using image recognition techniques, and based on the comparison with the previous checks, a new operational flow is started. For example, when the electronic device 10 detects the addition of a new in the stock of items 45 captured by the camera 35, the processor 50 and machine learning model 115 can determine if the object is to be or is not to be there, based on a predetermined list and the minimum and maximum thresholds defined in the machine learning model 115.

If the new object is determined to be a proper or good item; i.e., a new chair, new markers, a new fixture, etc., then the machine learning model 115 may be updated, which may include updating the electronic list 20 to recognize that the new object is to be in the room 30. Conversely, if the new object is determined to be improper or a bad item; i.e., a used cup, used paper, or dirty whiteboard, etc., then the processor 50 can issue an alert 55, which may be in the form of transmitting an electronic message to another device or system indicating that someone is to act to fix the anomaly in the room 30.

If the electronic device 10 detects the removal of a new object in the room 30, the processor 50 and machine learning model 115 may check if the object is missing, based on the electronic list 20 and the minimum and maximum thresholds defined in the machine learning model 115. If the current count of the stock of items 45 detected in the digital profile 40 is below the threshold for a specific object or item, the processor 50 can report the missing object by generating and transmitting the alert 55 to another device, system, or individual, etc. During this check, the processor 50 also performs a self-checkup of the electronic device 10, to identify anomalies of components of the electronic device 10 such as the camera 35, microphone 60, sensor 65, or other components. This specific check iterates over all the components and checks if connections and signal transmissions are still valid, compared to the initial configuration. If a signal is lost or a component is no longer connected or operable, the processor 50 can report these anomalies to IT support, etc.

In another example, the electronic device 10 may be programmed to perform contextual checks. This allows the ability for the electronic device 10 to access the invitees or attendees of a meeting in the room 30, and right before the meeting begins, the electronic device 10 may check whether the resources available in the room 30 are sufficient for the number of attendees and the type of attendees. For example, based on the computerized calendar system 110, the electronic device 10 can check how many people have confirmed their presence in the room 30. Thereafter, the electronic device 10, using camera 35 and image recognition analysis as well as the machine learning model 115, can count the number of chairs available in the room 30, for example. If the number of available chairs is lower than the number of potential participants, then the processor 50 can report the anomaly to a suitable attendance or can notify the meeting owner that a number of x chairs are missing, etc.

In another example, the electronic device 10 can leverage the usage of a sensor 65 to check a detected environmental condition 66 of the room 30 such as the temperature, humidity, air flow, and lighting, etc. and compare this with the baseline environmental condition 67 to determine whether the alert 55 is to be generated. In every checking procedure, the processor 50 can process the data from the sensor 65 and report the detected environmental condition 66 to a suitable member of the organization or support team, etc. The sensor 65 can be a single sensor that consolidates the various environmental detection capabilities into the sensor 65. Alternatively, the sensor 65 may be part of a group of sensors, which each perform a separate detection of different environmental conditions in the room 30. The sensor 65 can be connected into the electronic device 10 through wired or wireless connections.

In another example, an administrator of the room 30 can set up a specific set of items 45 within a certain priority. With this priority, the processor 50 can trigger different alerts and actions. For example, replacing a missing marker can have a lower priority compared with insufficient chairs or defective lighting. Together with the prioritization and/or classification of the stock of items 45, the administrator can also forward the anomalies to a specific individual or team to take appropriate actions. The processor 50 can also create electronic reports when the comparison of the digital profile 40 to the electronic list 20 detects some nonconformance or automatically on a time basis; i.e., every once a day or every week, etc. Furthermore, each room 30 may comprise a separate electronic device 10, which may be communicatively linked to other similarly configured electronic devices used to monitor other rooms in a building. The various devices may be linked to allow the machine learning model 115 to become more robustly trained and to increase an accuracy of replenishment of the stock of items 45 or the arrangement of the items 45 in the room 30.

Figure 6:
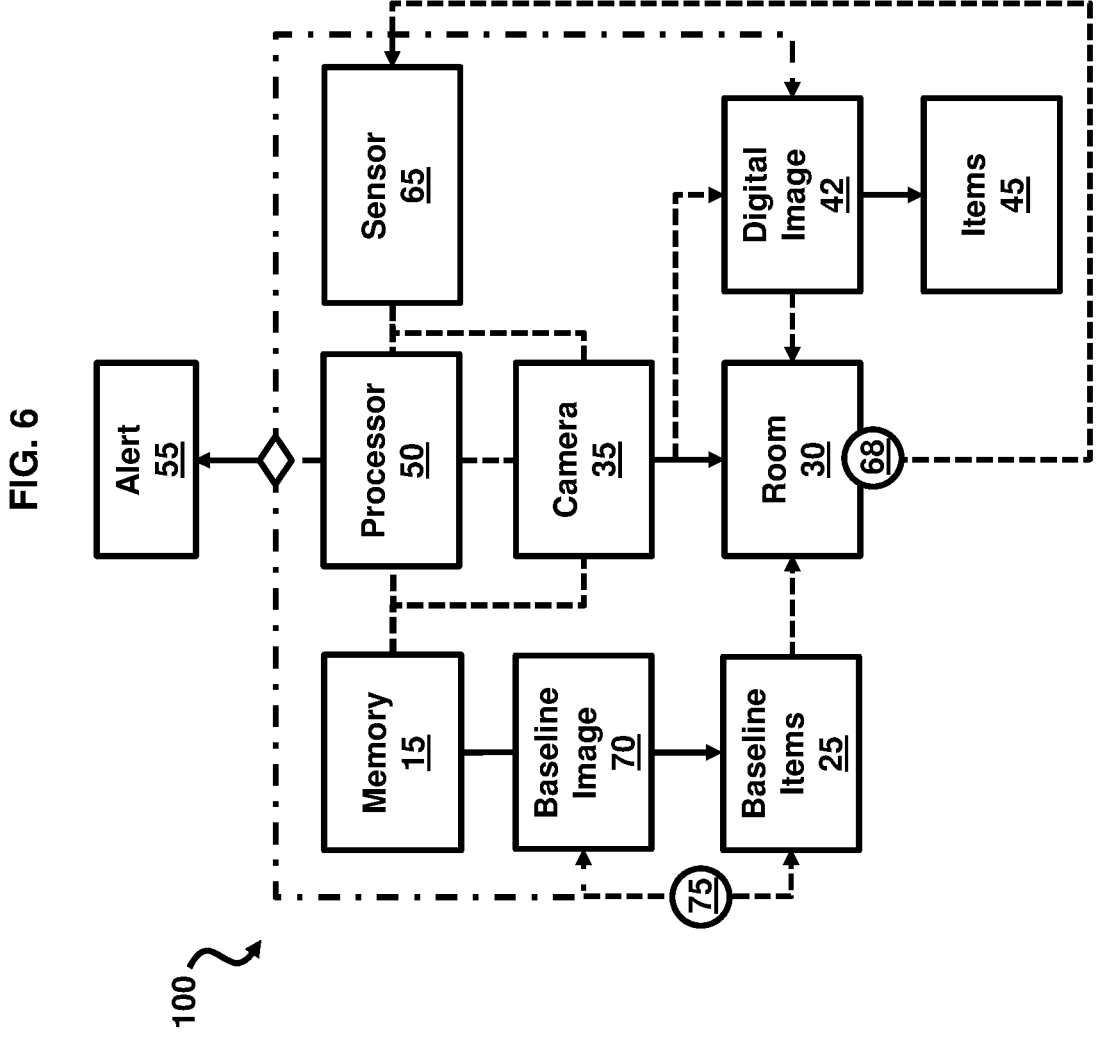
FIG. 6 is a block diagram illustrating an electronic device to capture a digital image for image recognition analysis, according to an example.

FIG. 6, with reference to FIGS. 1 through 5B, illustrates an electronic device 100. The electronic device 100 may comprise any suitable size, shape, or configuration and may be a standalone device, a computer, a communication device, an appliance, a stationary device, or a movable device, according to various examples. Furthermore, the electronic device 100 may be powered using different techniques; i.e., battery or cord. Moreover, the electronic device 100 may be independently and automatically operated or may be operated or engaged by a remote device or system. The electronic device 100 comprises a camera 35 to capture a digital image 42 of a room 30. In another example, the camera 35 may capture a digital video 44, not shown in FIG. 6, of the room 30. The digital image 42 comprises a picture of the stock of items 45 and an arrangement of the stock of items 45 monitored in the room 30. A sensor 65 is communicatively linked to the camera 35. The sensor 65 may be communicatively linked to the camera through wired or wireless connections. The sensor 65 is to detect movement 68 within the room 30 and trigger the camera 35 to capture the digital image 42 of the room 30 based on the detected movement 68. For example, the sensor 65 may be a motion detector. When the sensor 65 detects movement 68, the sensor 65 may transmit a signal to the camera 35 to capture the digital image 42 of the room 30. In this regard, the camera 35 may be in a sleep-mode of operation, but when the sensor 65 detects movement 68 and transmits the signal to the camera 35, this action transitions the camera 35 into a wake-mode of operation to allow the camera 35 to capture the digital image 42 of the room 30. Moreover, while the camera 35 may be programmed to capture the digital image 42 at established periods of time, the camera 35 may enter the sleep-mode of operation in between these programmed periods in order to save battery life, etc., but the detection of movement 68 by the sensor 65 awakens the camera 35 to capture the digital image 42 irrespective of whether the established periods of time is currently occurring.

The electronic device 100 also includes a memory 15 communicatively linked to the camera 35. In some examples, the memory may be communicatively linked to the camera 35 through wired or wireless connections. The memory 15 comprises a baseline image 70 of baseline items 25 associated with the room 30. The baseline image 70 may be a digital image, video, or a combination thereof initially taken by the camera 35 or other image capturing device to establish what the room 30 looks like in its undisturbed setting with the baseline items 25 arranged according to a set policy or standard promulgated by an organization, for example. The baseline image 70 may be static or can be updated as desired by the organization, with the updates to the baseline image 70 stored in the memory 15. The electronic device 100 also comprises a processor 50 communicatively linked to the memory 15, the camera 35, and the sensor 65. The processor 50 may be communicatively linked through wired or wireless connections to the memory 15, the camera 35, and the sensor 65. The processor 50 is to perform image recognition analysis of the digital image 42 by comparing the digital image 42 to the baseline image 70. According to an example, the image recognition analysis comprises assigning an electronic marker 75 to the baseline items 25 and determining whether the electronic marker 75 is found in the digital image 42. For example, the processor 50 may assign a different electronic marker 75 to each of the baseline items 25 in the room to determine whether a particular electronic marker 75 is detected in the digital image 42 during the image recognition analysis. In some examples, the electronic marker 75 comprises an electronic code or other identifier associated with a pixel over the baseline items 25 in the baseline image 70. The processor 50 is to transmit an alert 55 when the image recognition analysis detects differences between the digital image 42 and the baseline image 70 which exceed a threshold difference level. In some examples, the threshold difference level may be defined by a quantitative factor, a qualitative factor, a combination thereof. An example of a quantitative factor may be the number of differences between the digital image 42 and the baseline image 70. An example of a qualitative factor may be the extent of the differences between the digital image 42 and the baseline image 70. For example, the baseline items 25 may include six chairs surrounding and touching a conference table in the room 30. The stock of items 45 and an arrangement of the stock of items 45 monitored in the room 30 and captured in the digital image 42 by the camera 35 may indicate that the six chairs surround the conference table, but do not touch the conference table. Accordingly, from a quantitative factor analysis, this may represent six differences between the baseline image 70 and the digital image 42 captured by the camera 35. However, from a qualitative factor analysis, the severity or extent of the difference between having the chairs touching the table or spaced apart from the table is not considered to be a difference by the image recognition analysis that will cause the processor 50 to transmit an alert 55. In this regard, the image recognition analysis may be programmed to include both quantitative factors and qualitative factors such that the threshold difference level is defined for each scenario and for each of the baseline items 25 and corresponding stock of items 45 in the room 30.

Figure 7:
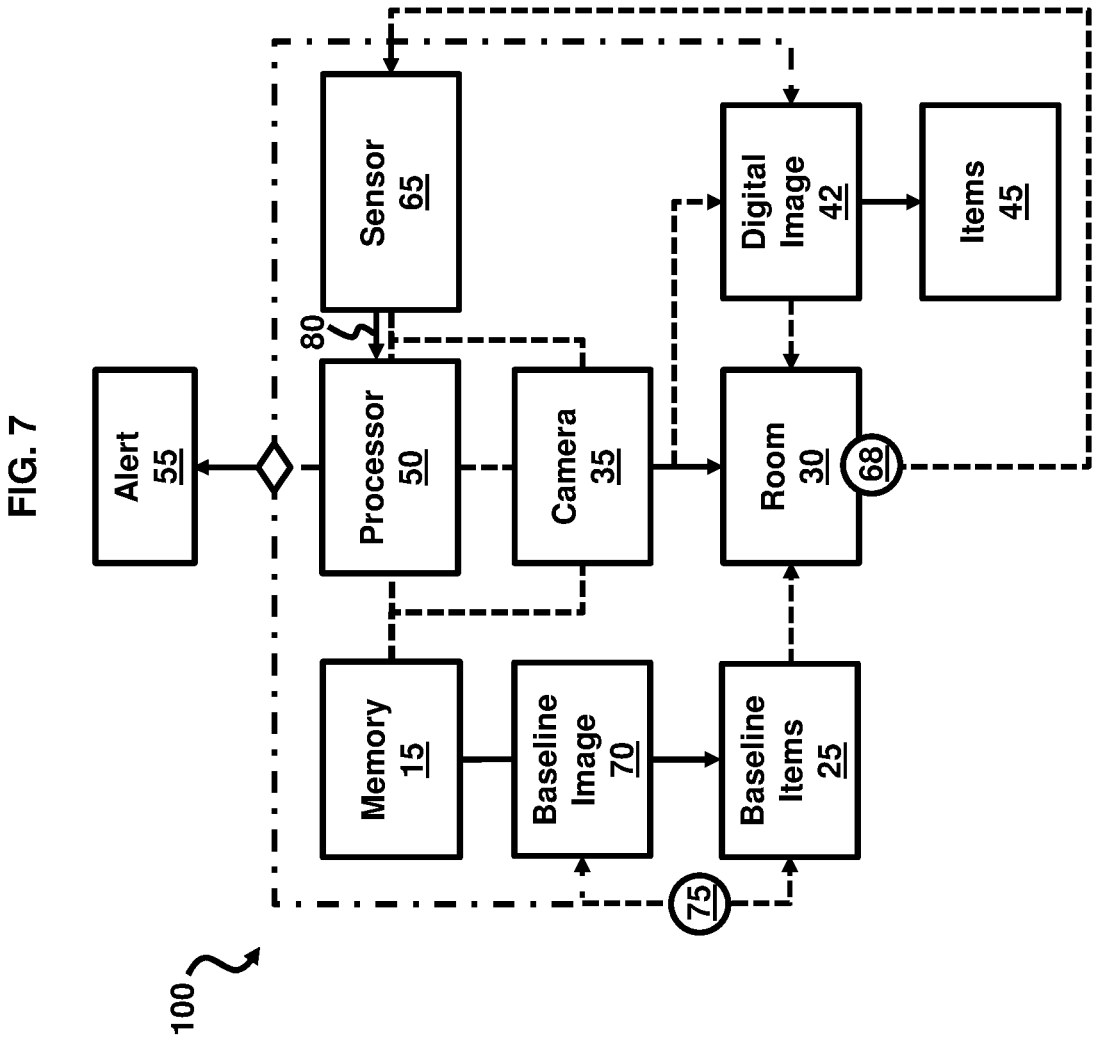
FIG. 7 is a block diagram illustrating using a signal from a sensor of the electronic device of FIG. 6 to determine whether an alert is transmitted, according to an example.

FIG. 7, with reference to FIGS. 1 through 6, illustrates that the sensor 65 is to transmit a signal 80 to the processor 50 to compare the digital image 42 to the baseline image 70 based on the detected movement 68 to determine whether the alert 55 is to be transmitted. In some examples, the signal 80 may be an electric signal, a mechanical signal, an optical signal, a magnetic signal, a chemical signal, or a combination thereof. The processor 50 may be automatically programmed to compare the digital image 42 to the baseline image 70 whenever the sensor 65 transmits the signal 80 upon detecting movement 68 in the room 30. In some examples, the movement 68 detected by the sensor 65 may be a live movement 68 of the stock of items 45 or arrangement of the items 45 in the room 30 or a detected movement 68 based on a change in position of the stock of items 45 or arrangement of the items 45 in the room 30, as described below.

Figure 8:
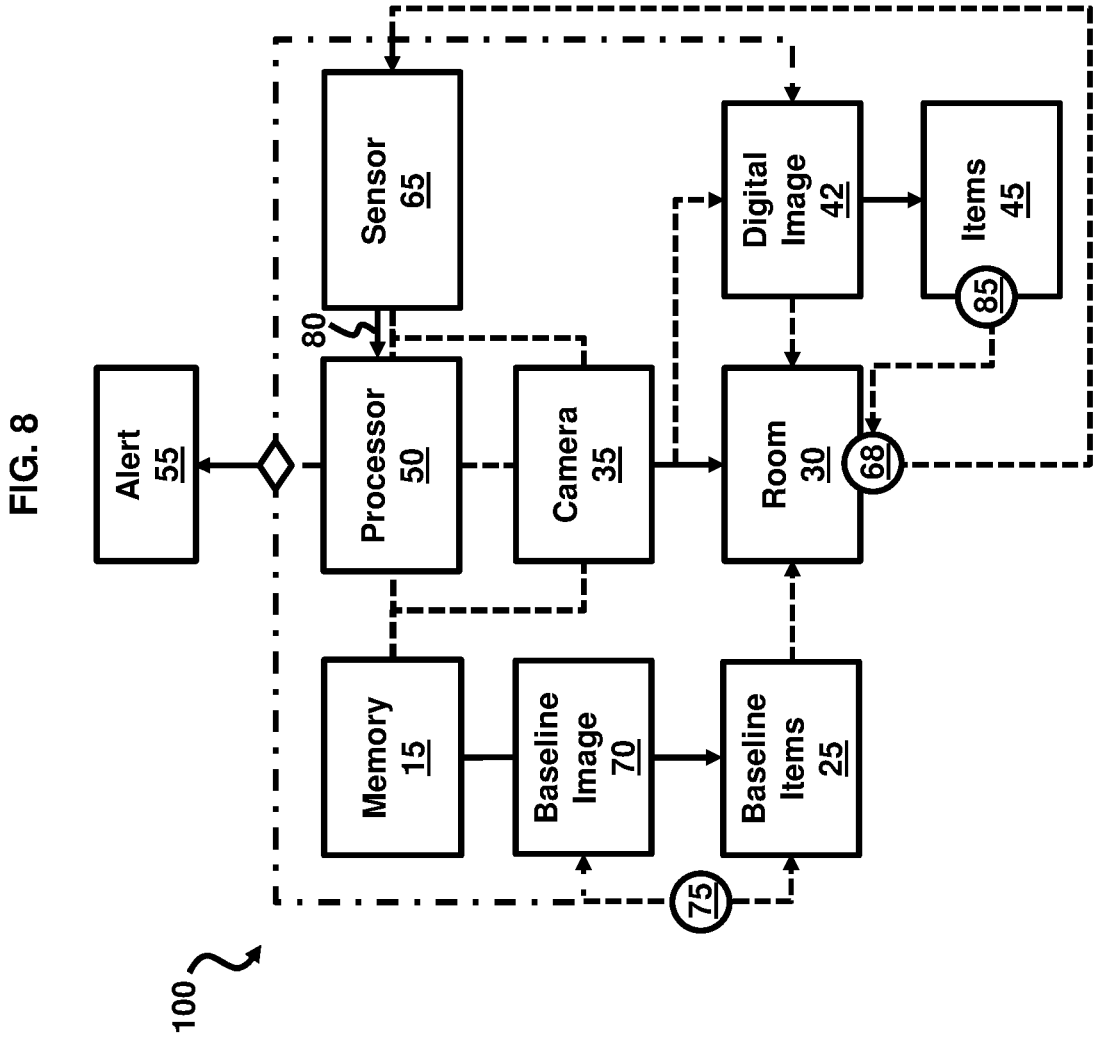
FIG. 8 is a block diagram illustrating the electronic device of FIG. 6 with the sensor detecting movement, according to an example.

FIG. 8, with reference to FIGS. 1 through 7, illustrates that the sensor 65 is to detect the movement 68 of the stock of items 45 and the arrangement of the stock of items 45 located in the room 30 by detecting a RFID tag 85 attached to the stock of items 45 and detecting a change in a location of the RFID tag 85 compared with a previous detection of the RFID tag 85. In this regard, each of the stock of items 45 located in the room 30 may be affixed with a RFID tag 85, which may be in the form of a tag device, patch, Quick Response (QR) label or other identifying tag that may be read using radio frequency imaging by the camera 35 and analyzed by the processor 50, the sensor 65, or a combination thereof. In an example, when the sensor 65 detects that the stock of items 45 has been moved in the room 30 based on the relative positions of the RFID tag 85 attached or associated with the stock of items 45 over a period of time, then the sensor 65 compares the location of the RFID tag 85 from a previous reading of the location of the RFID tag 85 in the room 30. In this regard, the sensor 65 may have processing capabilities or may work with the processor 50 to perform the RFID location analysis and may retrieve the data of the previous locations of the RFID tag 85 from the memory 15, as needed.

Figure 9:
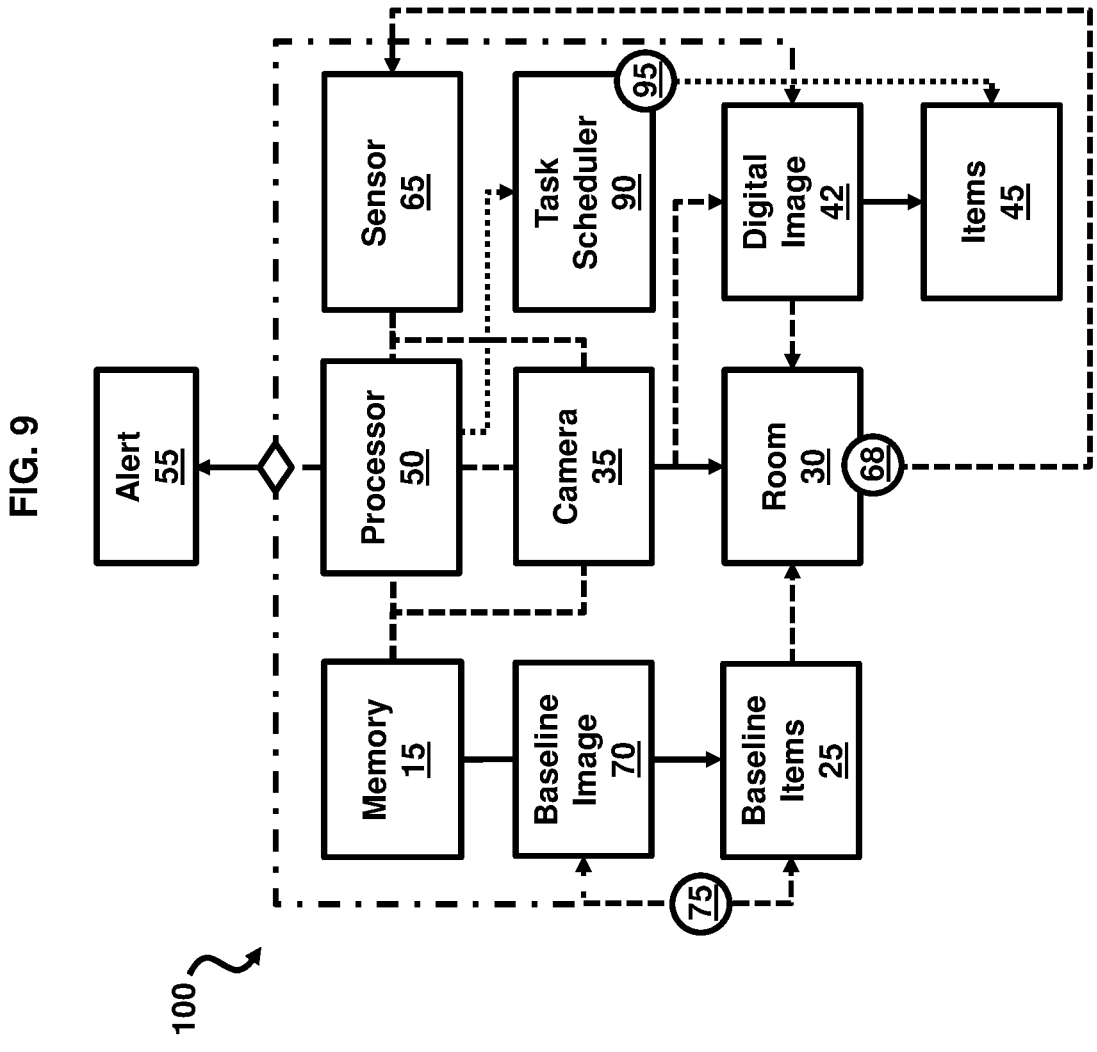
FIG. 9 is a block diagram illustrating a task scheduler set of instructions being executed by the processor of the electronic device of FIG. 6, according to an example.

FIG. 9, with reference to FIGS. 1 through 8, illustrates that the electronic device 100 may comprise task scheduler machine readable instructions 90 executed by the processor 50 upon the processor 50 transmitting the alert 55. In an example, the task scheduler machine readable instructions 90 may be a computerized set of instructions executed by the processor 50 or another processing device. For example, the task scheduler machine readable instructions 90 may be associated with a maintenance worker's tasks for performing his/her duties. The task scheduler machine readable instructions 90 is to create an electronic ticket 95 to reset the stock of items 45 and the arrangement of the stock of items 45 located in the room 30 to align with the baseline items 25 associated with a room 30. Accordingly, the electronic ticket 95 created by the task scheduler machine readable instructions 90 may be transmitted to a communication device, such as a smartphone, tablet computer, or other computing device, which provides the maintenance worker or other appropriate individual whose job it is to replenish the stock of items 45 or the arrangement of items 45 in the room 30, with instructions for resetting the room 30 so that the room 30 once again corresponds with the baseline items 25 presented in the baseline image 70 of the room 30. In some examples, the electronic ticket 95 may be in the form of a text, email, phone call, or other communication mechanisms.

Figure 10:
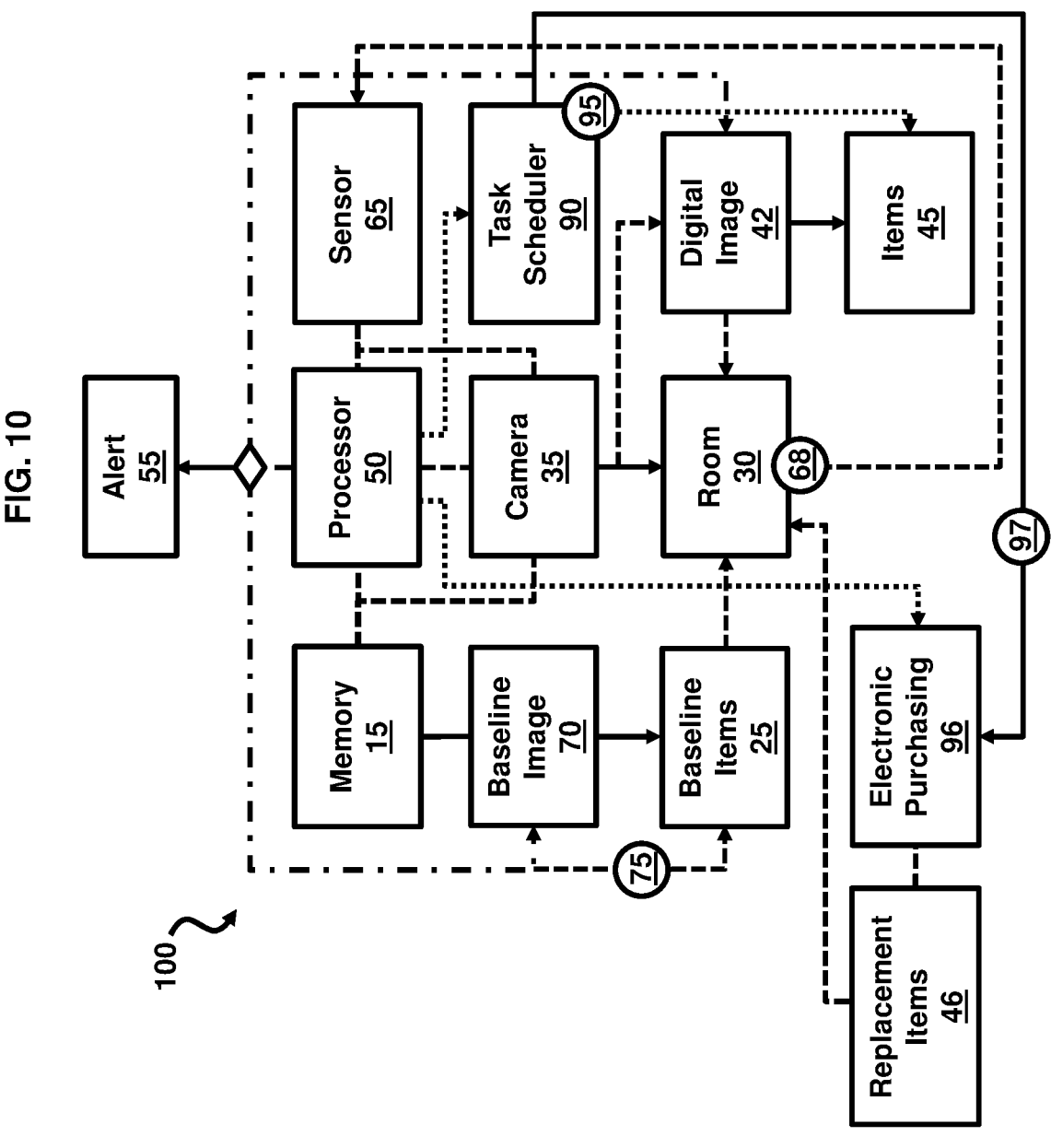
FIG. 10 is a block diagram illustrating an electronic purchasing set of instructions being executed by the processor of the electronic device of FIG. 6, according to an example.

FIG. 10, with reference to FIGS. 1 through 9, illustrates that the electronic device 100 may comprise electronic purchasing machine readable instructions 96 executed by the processor 50. The task scheduler machine readable instructions 90 is to transmit an executable command 97 to the electronic purchasing machine readable instructions 96 to determine an amount of replacement items 46 available for resetting the room 30, and to automatically purchase the replacement items 46 when the amount of the replacement items 46 is below a threshold inventory level. In this regard, an organization may have an inventory of replacement items 46 in-house, on location, or otherwise readily available for restocking and resetting the room 30. However, if there is a deficiency in the inventory of replacement items 46; i.e., below a threshold inventory level, then the electronic purchasing machine readable instructions 96 may receive the executable command 97 from the task scheduler machine readable instructions 90 to purchase additional inventory of the replacement items 46. For example, the electronic purchasing machine readable instructions 96 may be linked to an inventory control system or an online e-commerce website for purchasing replacement items 46.

In some examples, the processor 50 described herein and/or illustrated in the figures may be embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process and/or execute computer logic instructions capable of providing digital and/or analog signals for performing various functions as described herein including controlling the operations of the electronic device 10, 100 and associated components. In some examples, the processor 50 may comprise a central processing unit (CPU) of the electronic device 10, 100. In other examples the processor 50 may be a discrete component independent of other processing components in the electronic device 10, 100. In other examples, the processor 50 may be a microprocessor, microcontroller, hardware engine, hardware pipeline, and/or other hardware-enabled device suitable for receiving, processing, operating, and performing various functions for the electronic device 10, 100. The processor 50 may be provided in the electronic device 10, 100, coupled to the electronic device 10, 100, or communicatively linked to the electronic device 10, 100 from a remote networked location, according to various examples.

The electronic device 10, 100 may comprise various controllers, switches, processors, and circuits, which may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

Various examples described herein may include both hardware and software elements. The examples that are implemented in software may include firmware, resident software, microcode, etc. Other examples may include a computer program product configured to include a pre-configured set of instructions, which when performed, may result in actions as stated in conjunction with the methods described above. In an example, the preconfigured set of instructions may be stored on a tangible non-transitory computer readable medium or a program storage device containing software code.

FIGS. 11A through 11E, with reference to FIGS. 1 through 10, illustrate an example system 200 to monitor a room 30 and detect changes to the quality and/or quantity of a stock of items 45 or an arrangement of the items 45 in the room 30. The system 200 may be used to automatically check for unconformities in the room 30 such as missing markers, missing chairs, some item that was left behind such as paper or a cup of coffee on the table or a spilled water bottle on the floor, etc. In an example, the system 200 could run a self-checkup to identify issues such as an unplugged monitor, missing computer cables, malfunctioning equipment, and report/alert the issues to a suitable real estate and workplace solutions response individual or team; i.e., management, IT staff, maintenance staff, etc. indicating that the room 30 is to be reset or that something is wrong in the room 30 and must be fixed, etc. Depending on the missing item 45 in the room 30, the system 200 may also proactively create a purchase order to refill, replace, or replenish some of the items 45.

In the examples of FIGS. 11A through 11E, the electronic device 10, 100 comprises or is communicatively linked to a processor 50 and a machine-readable storage medium 205. Processor 50 may include a central processing unit, micro-processors, hardware engines, and/or other hardware devices suitable for retrieval and execution of instructions stored in a machine-readable storage medium 205. Processor 50 may fetch, decode, and execute computer-executable instructions 210 to enable execution of locally-hosted or remotely-hosted applications for controlling action of the electronic device 10, 100. The remotely-hosted applications may be accessible on remotely-located devices; for example, remote communication device 215, which is accessible through a wired or wireless connection or network 220. For example, the remote communication device 215 may be a laptop computer, tablet device, smartphone, or notebook computer. As an alternative or in addition to retrieving and executing instructions, processor 50 may include electronic circuits including a number of electronic components for performing the functionality of the computer-executable instructions 210.

The machine-readable storage medium 205 may be any electronic, magnetic, optical, or other physical storage device that stores executable instructions. Thus, the machine-readable storage medium 205 may be, for example, Random Access Memory, an Electrically-Erasable Program-mable Read-Only Memory, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the machine-readable storage medium 205 may include a non-transitory computer-readable storage medium 205. The machine-readable storage medium 205 may be encoded with executable instructions for enabling execution of remotely-hosted applications accessed on the remote communication device 215.

In an example, the processor 50 executes the computer-executable instructions 210 that when executed cause the processor 50 to perform computer-executable instructions 225-295. As provided in FIG. 11A, establishing instructions 225 establish an electronic model room profile 105 comprising an electronic list 20 of baseline items 25 and a description of an arrangement of the baseline items 25 associated with a room 30. In an example, the electronic model room profile 105 may comprise the baseline image 70 captured by a camera 35. Receiving instructions 230 receive a digital profile 40 of the room 30. In some examples, the digital profile 40 comprises a digital image 42, a digital video 44, or a combination thereof of a stock of items 45 and an arrangement of the items 45 monitored in the room 30. The stock of items 45 and the arrangement of the items 45 monitored in the room 30 may include any number or type of items 45 in the room 30 capable of being monitored by a camera 35, or detected by a microphone 60 or sensor 65, according to some examples. Comparing instructions 235 compare the digital profile 40 to the electronic list 20 by detecting whether differences in the digital profile 40 and the electronic list 20 exceed a threshold difference level based on a quality of the differences. In this regard, the threshold difference level may be a programmed qualitative level established by an organization and considered by the pro-cessor 50 upon performing image recognition analysis of the digital profile 40 to detect differences, as described above. The quality of differences may include the extent, scope, scale, or other non-quantitative indicator of the differences between the digital profile 40 to the electronic list 20. Moreover, the quality of differences may also be pro-grammed into the image recognition analysis executed by the processor 50. Generating instructions 240 generate an alert 55 when the threshold difference level has been met. For example, when the quality of differences detected during the image recognition analysis exceed a programmed or real-time threshold difference level, then the alert 55 is generated. In an example, the alert 55 comprises instructions whether replacement items 46 or a rearrangement of the items 45 are needed in the room 30 based on the electronic model room profile 105. In some examples, the alert 55 may comprise an electronic alert, an audio alert, a video alert, or a combination thereof.

Figure 11A:
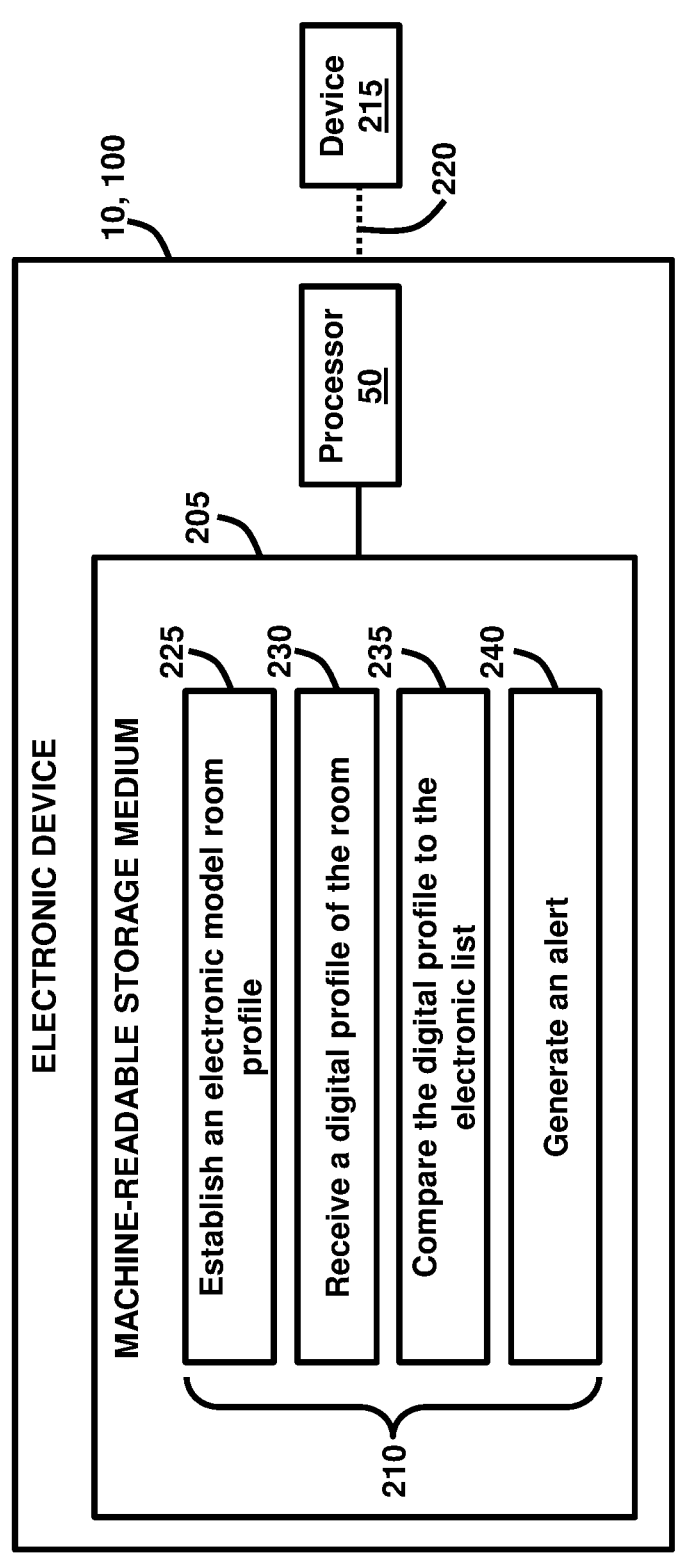
FIG. 11A is a block diagram illustrating a system to monitor a room using an electronic device, according to an example.
Figure 11B:
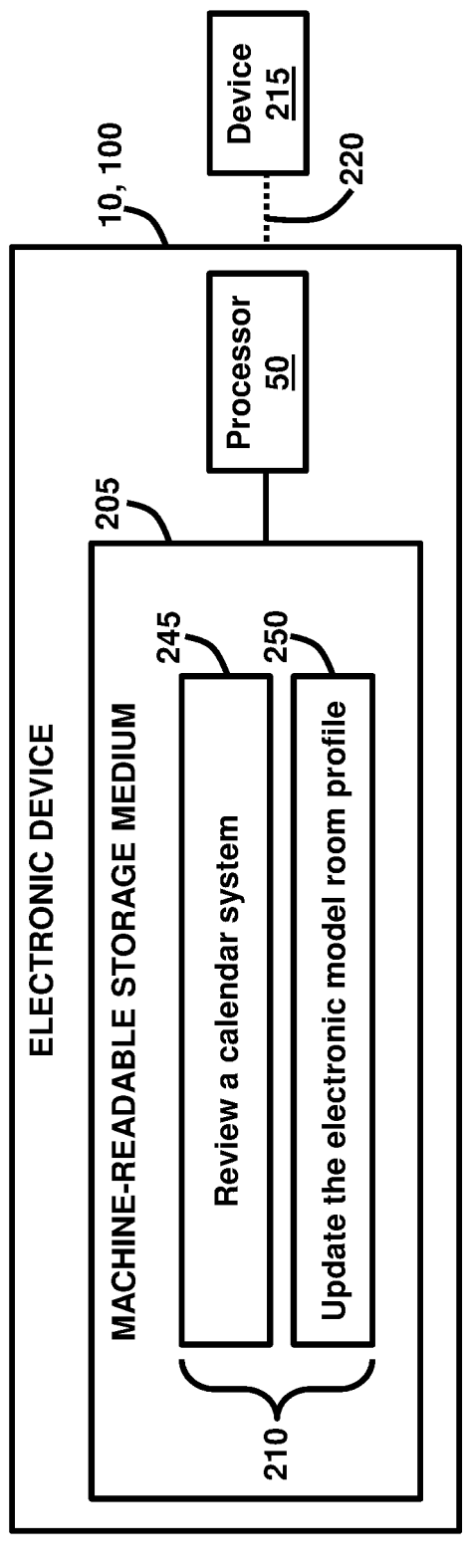
FIG. 11B is a block diagram illustrating a system to interact with a calendar system using an electronic device, according to an example.

As illustrated in FIG. 11B, reviewing instructions 245 review a computerized calendar system 110 to determine a meeting status associated with the room 30. In an example, the computerized calendar system 110 may be an electronic calendar system 110 that stores details about the use of the room 30 including dates, times, duration, attendees, etc. The computerized calendar system 110 may be a stand-alone system or may be stored in the memory 15 for retrieval and processing by the processor 50. The meeting status com-prises (i) a past meeting, (ii) a current meeting, (iii) a future meeting scheduled for the room 30, (iv) a number and identification of attendees associated with the past meeting, the current meeting, and the future meeting, (v) a purpose of the past meeting, the current meeting, and the future meet-ing, or (vi) a combination thereof. A past meeting may identify a meeting that previously occurred in the room 30. The past meetings may extend as far back as necessary to train a computerized machine learning model 115 executed by the processor 50 to identify trends associated with use of the room 30 in the past. A current meeting may identify whether the room 30 is currently being occupied and for how long the room 30 has been reserved along with the attendees, and purpose of the current meeting. This information may be used to train the computerized machine learning model 115 as well as to identify likely changes to the stock of items 45 or the arrangement of items 45 in the room 30 based on the duration of the reservation associated with the current meet-ing, the attendees, and the purpose of the current meeting.

A future meeting schedule for the room 30 may identify whether the room has been reserved for a future meeting and by who along with the expected attendees and the expected duration of the meeting. The computerized machine learning model 115 may predict the expectation of the condition of the room 30 based on the above-identified factors in order to ensure that the stock of items 45 or the arrangement of items 45 align with the electronic model room profile 105. For example, if the future meeting is reserved for senior-level managers at an organization, the processor 50 may cause the camera 35 to capture the digital profile 40 of the room 30 with greater frequency leading up to the future meeting in order for the processor 50 to more frequently compare the digital profile 40 with the electronic model room profile 105 to ensure the detected differences are below a threshold difference level.

The number and identification of attendees associated with the past meeting, the current meeting, and the future meeting may be used by the computerized machine learning model 115 to predict a likely necessity to replenish the stock of items 45 or reset the arrangement of the items 45 in the room 30 based on past experiences with the same number and identification of attendees. In an example, the identifi-cation of the attendees may include the position or level of the attendees; i.e., interns, managers, executives, etc., which may also determine whether the camera 35 is to capture a digital profile 40 of the room 30 with greater frequency leading up to future meetings for the same number or same identification of attendees. The purpose of the past meeting, the current meeting, and the future meeting may be used by the computerized machine learning model 115 may predict what type of the stock of items 45 and what the arrangement of items 45 is likely to be based on past purposes or uses of the room 30. For example, if the purpose of the past meetings for the room 30 include team building meetings, then there may be an expectation that the table and chairs in the room 30 will be moved to provide more space for attendees to move about with greater frequency and disruption and perform team building activities in the room 30, and thus if the chairs are not neatly arranged around the table prior to the meeting, then this may be permissible; i.e., resetting of the room 30 prior to the meeting is not needed. In this regard, the threshold difference level may be high and the quality of differences between the captured digital profile 40 and the electronic model room profile 105 may be low such that an alert 55 is not triggered or generated. Updating instructions 250 update the electronic model room profile 105 based on the meeting status. In this regard, the electronic model room profile 105 may constantly change based on the meeting status to allow the computerized machine learning model 115 to more accurately predict how the room 30 will be utilized and what condition the room 30 is to be prior to being used; i.e., extremely neat and organized, somewhat neat and organized, or minimally neat and organized, etc.

Figure 11C:
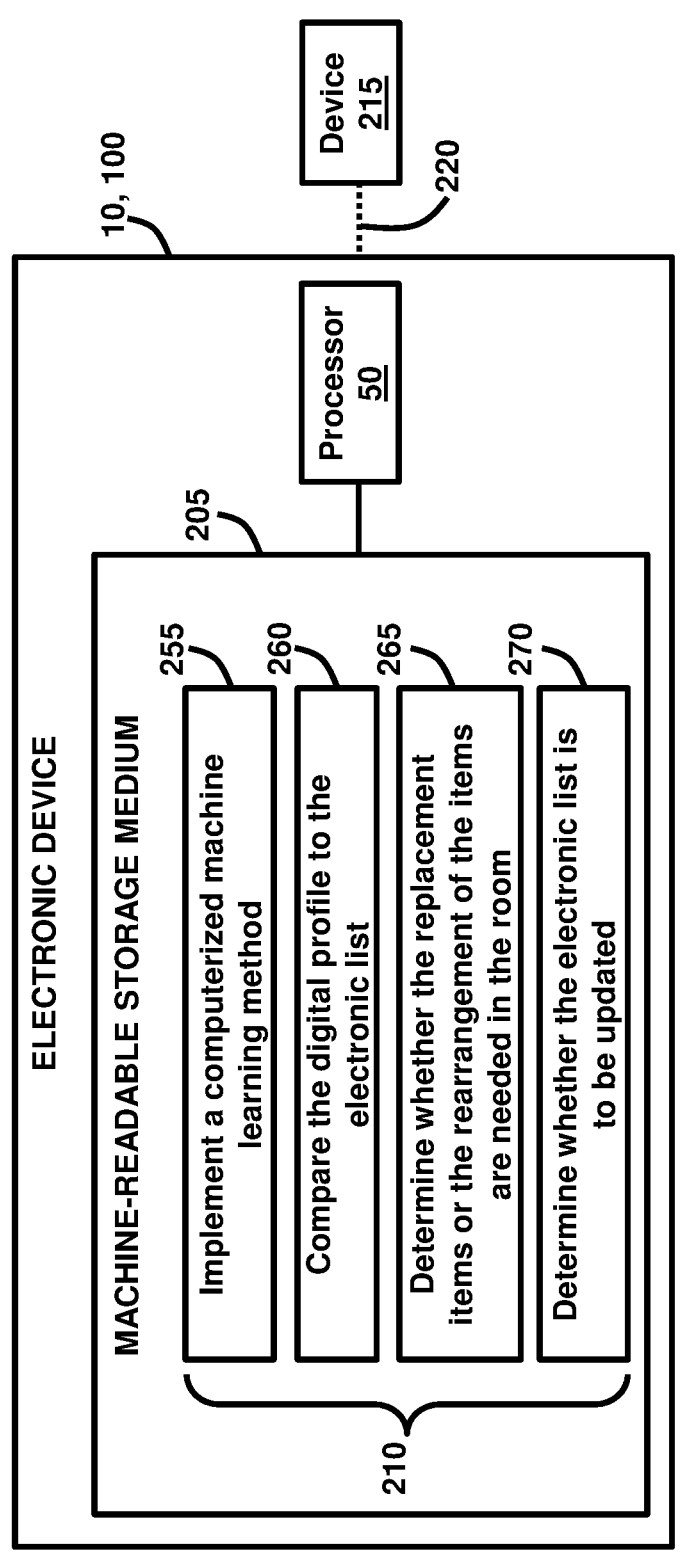
FIG. 11C is a block diagram illustrating a system to implement a machine learning model using an electronic device, according to an example.

As illustrated in FIG. 11C, implementing instructions 255 implement the computerized machine learning model 115 to analyze the digital profile 40 and the electronic model room profile 105. The computerized machine learning model 115 may initially be trained using past data associated with the room 30 as well as the baseline items 25 and arrangement of the baseline items 25 of the room 30. When the computerized machine learning model 115 is trained with sufficient data, the computerized machine learning model 115 may properly predict and create rules for how the camera 35 is to be utilized; i.e., frequency and timing of capturing the digital profile 40 of the room 30 as well as how similar the digital profile 40 and the electronic model room profile 105 have to be to each other before triggering the alert 55 for the room 30 to be reset. Comparing instructions 260 compare the digital profile 40 to the electronic list 20 using imaging processing procedures and techniques, such as a pixel-by-pixel analysis of a digital image 42 provided in the digital profile 40 compared with a baseline image 70 of the room 30. Determining instructions 265 determine whether the replacement items 46 or the rearrangement of the items 45 are needed in the room 30 based on the meeting status. More particularly, the determining instructions 265 may determine whether replacement items 46 are available for replenishing the stock of items 45 in the room or whether electronic purchasing machine readable instructions 96 are to be executed for purchasing the replacement items 46 from an outside source. Determining instructions 270 determine whether the electronic list 20 is to be updated based on the comparison of the digital profile 40 to the electronic list 20 and the update to the electronic model room profile 105. In this regard, the computerized machine learning model 115 may identify trends in how the room 30 is being utilized and how the stock of items 45 are being consumed, moved, and/or replaced, which may require the camera 35 to once again capture a baseline image 70 to create an updated electronic model room profile 105 and/or electronic list 20.

Figures 11D, 11E:
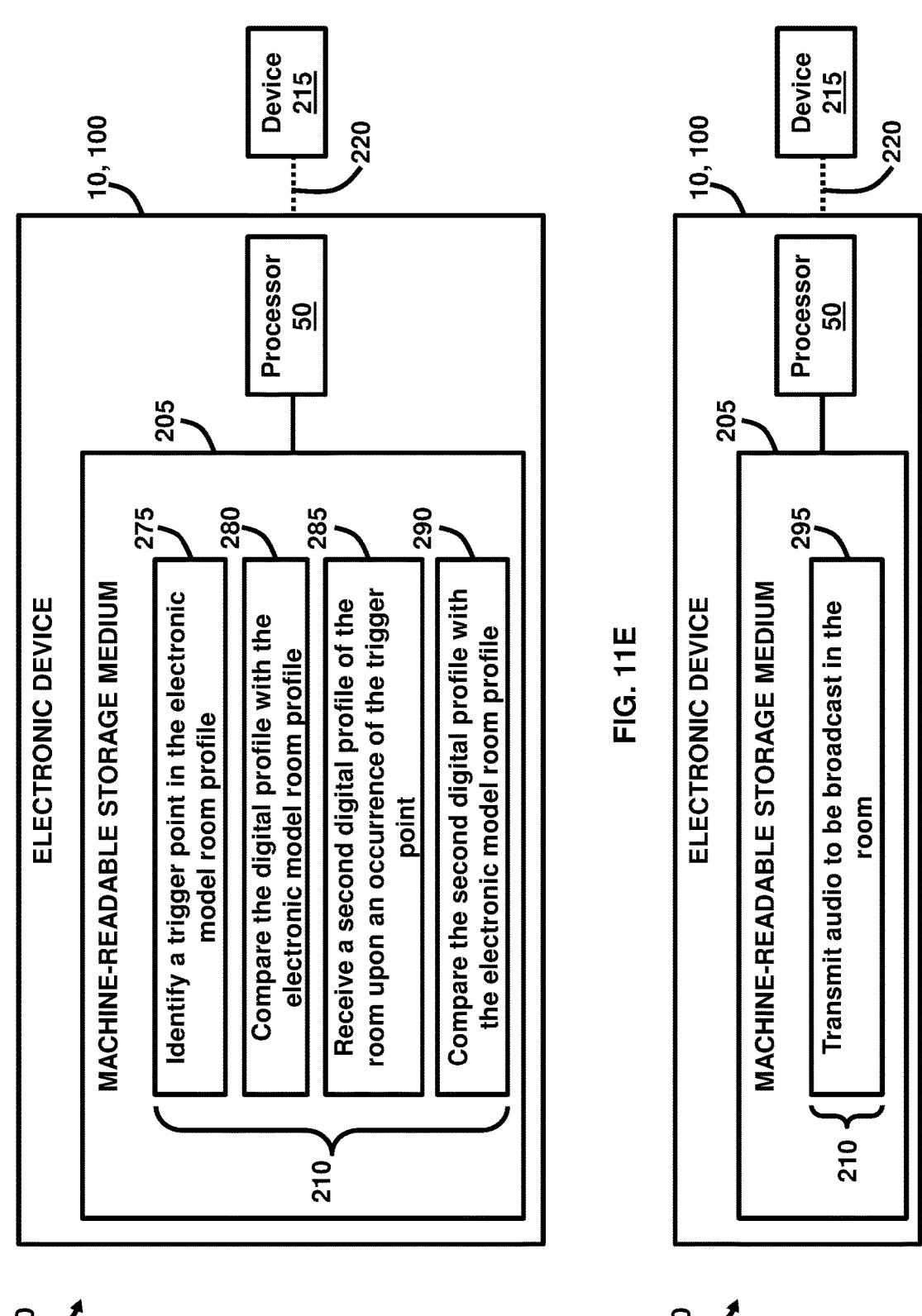
FIG. 11D is a block diagram illustrating a system to utilize trigger points in an electronic model room profile using an electronic device, according to an example.
FIG. 11E is a block diagram illustrating a system to broadcast audio instructions in a room using an electronic device, according to an example.

As illustrated in FIG. 11D, identifying instructions 275 identify a trigger point 120 in the electronic model room profile 105. In an example, the trigger point 120 comprises an electronic signal, computer code, or other identifier indicating changes to the stock of items 45 and the arrangement of the items 45 located in the room 30, a time parameter, movement 68 in the room 30, a detected environmental condition 66 in the room 30, scheduled use of the room 30, or a combination thereof. For example, the trigger point 120 may be set according to a quantitative or qualitative aspect of the changes to the stock of items 45 and the arrangement of the items 45 located in the room 30 such that whenever the quantitative or qualitative aspects of the stock of items 45 and the arrangement of the items 45 divert from a threshold difference level or range, then the trigger point 120 occurs. Moreover, the trigger point 120 may be set according to a time parameter, which may be a programmed timestamp according to a set time and date. Additionally, the trigger point 120 may occur when the camera 35 and/or sensor 65 detects or captures movement 68 and/or a detected environmental condition 66 associated with the room 30. For example, the movement 68 may be an actual live movement of individuals or items 45 in the room, or the movement 68 may be a detected movement of the arrangement or location of the items 45 in the room 30 based on a comparison of a previous arrangement of the items 45 in the room; i.e., using an electronic marker 75 or RFID tag 85, etc. to perform image recognition analysis of the digital profile 40 compared to the electronic model room profile 105. The detected environmental condition 66 may relate to any aspect of the condition of the room including both natural conditions; i.e., temperature, humidity, and natural light, as well as artificial conditions; i.e., electric lighting, air flow from vents, and noise generated from devices or equipment in the room, etc. Accordingly, the trigger point 120 may occur upon the occurrence of the detected environmental condition 66 or the movement 68 detected in the room 30. Furthermore, the trigger point 120 may occur based on a scheduled use of the room 30 by using the machine learning model 115 to predict how the room 30 is likely to be used including how the stock of items 45 or the arrangement of the items 45 in the room 30 will likely change based on the type of use or purpose of using the room 30, and which is based on past uses of the room 30 and analyzing the differences between the digital profile 40 and the electronic model room profile 105 after the past uses of the room 30.

Comparing instructions 280 compare the digital profile 40 with the electronic model room profile 105 to determine whether a trigger point 120 has occurred. In this regard, although there may be differences between the digital profile 40 and the electronic model room profile 105, the trigger point 120 may not be able to occur if the differences do not reach a threshold difference level considered by the processor 50. The trigger point 120 may be changed depending on various criteria including the past, current, and future use and attendees of the room 30. Moreover, as the machine learning model 115 analyzes additional data based on uses of the room 30 and the associated changes in the stock of items 45 or the arrangement of items 45 in the room 30 as captured by the digital profile 40, the trigger point 120 may also be changed accordingly.

Receiving instructions 285 receive a second digital profile 41 of the room 30 upon an occurrence of the trigger point 120. In this regard, the camera 35 may capture the second digital profile 41 of the room 30 once the trigger point 120 occurs in order to determine a present status of the room 30 including capturing a digital image 42 and/or digital video 44 of the room 30 to determine whether the stock of items 45 or the arrangement of items 45 in the room requires further replenishment and/or resetting. For example, the camera 35 may take the digital profile 40 and the threshold difference level may not be reached based on a comparison of the digital profile 40 and the electronic model room profile 105. However, the computerized calendar system 110 may be updated to reflect a new scheduled use of the room 30. Based on this new reservation including the scheduled attendees, duration of use, and/or purpose of the use of the room 30, the trigger point 120 may occur, which causes the processor 50 to instruct the camera 35 to capture the second digital profile 41 of the room 30 to ensure the room 30 is properly set for the new scheduled use; i.e., to check whether the stock of items 45 or the arrangement of the items 45 aligns with the intended scheduled use of the room 30.

Moreover, comparing instructions 290 compare the second digital profile 41 with the electronic model room profile 105 to determine whether a second trigger point 121 has occurred. For example, the second trigger point 121 In an example, the trigger point 120 comprises an electronic signal, computer code, or other identifier indicating changes to the stock of items 45 and the arrangement of the items 45 located in the room 30, a time parameter, movement 68 in the room 30, a detected environmental condition 66 in the room 30, scheduled use of the room 30, or a combination thereof. For example, the second trigger point 121 may also be set according to a quantitative or qualitative aspect of the changes to the stock of items 45 and the arrangement of the items 45 located in the room 30 such that whenever the quantitative or qualitative aspects of the stock of items 45 and the arrangement of the items 45 divert from a threshold difference level or range, then the second trigger point 121 occurs. In this regard, the trigger point 120 and the second trigger point 121 may be different, which may be based on the scheduled use of the room 30. If the processor 50 determines that there is a deficiency in the stock of items 45 or the arrangement of the items 45 based on a comparison of the second digital profile 41 and the electronic model room profile 105, then the alert 55 may be generated and transmitted to a maintenance worker or other individual tasked with replenishing and/or resetting the room 30, etc.

As illustrated in FIG. 11E, transmitting instructions 295 transmit audio 63 to be broadcast in the room 30. In an example, the audio 63 comprises instructions for replacing items 45 or rearranging the items 45 in the room 30 in order to conform to the electronic model room profile 105. In this regard, the maintenance worker or other individual tasked with replenishing and/or resetting the room 30, etc. may be in the room 30 and may need more instructions regarding replacing items 45 or rearranging the items 45 in the room 30 in order to conform to the electronic model room profile 105. For example, the instructions provided in the audio 63 may indicate that the chairs in the room 30 are to be moved up against the wall or the stock of items 45 are to be increased based on a scheduled use of the room 30 as identified by the computerized calendar system 110, etc.

The automated aspects of the electronic device 10, 100 allows the electronic device 10, 100 to perform room monitoring at any time including after business hours. In this regard, the electronic device 10, 100 can work on predetermined events; i.e., between meetings, upon the detection of movement 68, or the detection of a detected environmental condition 66, or at a set time including after normal business hours. Accordingly, this improves the inefficiencies of using working hours of individuals going from room-to-room to discover missing or non-working items 45 or improper arrangement of the items 45 in the room 30.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

22

What is claimed is:

1. An electronic device comprising:
a memory, wherein an electronic list of baseline items and a description of an arrangement of the baseline items associated with a room are stored in the memory, and wherein the baseline items and the description of the arrangement of the baseline items are generated based on room usage information and a classification of an individual using the room;
a camera to capture a digital profile of the room, wherein the digital profile comprises a stock of items and an arrangement of the items monitored in the room; and
a processor communicatively linked to the camera, wherein the processor is to:
compare the digital profile to the electronic list; and
generate an alert when the digital profile is different than the electronic list.

2. The electronic device of claim 1, wherein the digital profile comprises a digital image of the room, a digital video of the room, or a combination thereof.

3. The electronic device of claim 1, comprising a microphone communicatively linked to the processor and the camera, wherein the microphone is to capture audio from the room, wherein the electronic list comprises audio instructions to trigger the alert, and wherein the processor is to compare the captured audio from the room with the electronic list to determine whether the alert is to be generated.

4. The electronic device of claim 3, comprising a sensor communicatively linked to the processor and the camera, wherein the sensor is to detect an environmental condition of the room, wherein the electronic list comprises a baseline environmental condition of the room, and wherein the processor is to compare the detected environmental condition with the baseline environmental condition to determine whether the alert is to be generated.

5. The electronic device of claim 4, wherein the processor, the microphone, the sensor, or a combination thereof is to trigger the camera to capture the digital profile of the room.

6. The electronic device of claim 1, comprising electronic purchasing machine readable instructions executed by the processor, wherein the electronic purchasing machine readable instructions determine an amount of replacement items available for resetting the room, and automatically purchase the replacement items when the amount of the replacement items is below a threshold inventory level.

7. The electronic device of claim 1, wherein the processor identifies a trigger point that triggers the camera to capture the digital profile of the room, wherein the trigger point comprises a time parameter, occurs between meetings, or a combination thereof.

8. The electronic device of claim 1, wherein the digital profile comprises a digital video of the room, wherein the digital video is stored locally in the camera, is stored in the memory, or a combination thereof, and the digital video is retrieved by the processor when performing the comparison of the digital profile with the electronic list.

9. An electronic device comprising:
a camera to capture a digital image of a room, wherein the digital image comprises a stock of items and an arrangement of the stock of items monitored in the room;
a sensor communicatively linked to the camera, wherein the sensor is to detect movement within the room and trigger the camera to capture the digital image of the room based on the detected movement;

a memory communicatively linked to the camera, wherein the memory comprises a baseline image of baseline items associated with the room; and a processor communicatively linked to the memory, the camera, and the sensor, wherein the processor is to:

perform image recognition analysis of the digital image by comparing the digital image to the baseline image, wherein the image recognition analysis comprises assigning an electronic marker to the baseline items and determining whether the electronic marker is found in the digital image; and transmit an alert when the image recognition analysis detects differences between the digital image and the baseline image which exceed a threshold difference level.

10. The electronic device of claim 9, wherein the sensor is to transmit a signal to the processor to compare the digital image to the baseline image based on the detected movement to determine whether the alert is to be transmitted.

11. The electronic device of claim 9, wherein the sensor is to detect the movement of the stock of items and the arrangement of the stock of items located in the room by detecting a radio frequency identification (RFID) tag attached to the stock of items and detecting a change in a location of the RFID tag compared with a previous detection of the RFID tag.

12. The electronic device of claim 9, comprising task scheduler machine readable instructions executed by the processor upon the processor transmitting the alert, wherein the task scheduler machine readable instructions is to create an electronic ticket to reset the stock of items and the arrangement of the stock of items located in the room to align with the baseline items associated with a room.

13. The electronic device of claim 12, comprising electronic purchasing machine readable instructions executed by the processor, wherein the task scheduler machine readable instructions is to transmit an executable command to the electronic purchasing machine readable instructions to determine an amount of replacement items available for resetting the room, and to automatically purchase the replacement items when the amount of the replacement items is below a threshold inventory level.

14. The electronic device of claim 9, comprising electronic purchasing machine readable instructions linked to one or more of an inventory control system or an online e-commerce website for purchasing replacement items.

15. A non-transitory machine-readable storage medium comprising computer-executable instructions that when executed cause a processor communicatively linked to an electronic device to:

establish an electronic model room profile comprising an electronic list of baseline items and a description of an arrangement of the baseline items associated with a room, the baseline items being non-human resources;

receive a digital profile of the room, wherein the digital profile comprises a digital image, a digital video, or a combination thereof of a stock of items and an arrangement of the items monitored in the room;

compare the digital profile to the electronic list by detecting whether differences in the digital profile and the electronic list exceed a threshold difference level based on a quality of the differences; and generate an alert when the threshold difference level has been met, wherein the alert comprises instructions whether replacement items or a rearrangement of the items are needed in the room based on the electronic model room profile.

16. The non-transitory machine-readable storage medium of claim 15, wherein the instructions, when executed, further cause the processor to:

review a calendar system to determine a meeting status associated with the room, wherein the meeting status comprises (i) a past meeting, (ii) a current meeting, (iii) a future meeting scheduled for the room, (iv) a number and identification of attendees associated with the past meeting, the current meeting, and the future meeting, (v) a purpose of the past meeting, the current meeting, and the future meeting, or (vi) a combination thereof; and update the electronic model room profile based on the meeting status.

17. The non-transitory machine-readable storage medium of claim 16, wherein the instructions, when executed, further cause the processor to:

implement a computerized machine learning model to analyze the digital profile and the electronic model room profile;

compare the digital profile to the electronic list;

determine whether the replacement items or the rearrangement of the items are needed in the room based on the meeting status; and determine whether the electronic list is to be updated based on the comparison of the digital profile to the electronic list and the update to the electronic model room profile.

18. The non-transitory machine-readable storage medium of claim 15, wherein the instructions, when executed, further cause the processor to:

identify a trigger point in the electronic model room profile, wherein the trigger point comprises changes to the stock of items and the arrangement of the items located in the room, a time parameter, movement in the room, an environmental condition in the room, scheduled use of the room, or a combination thereof;

compare the digital profile with the electronic model room profile to determine whether a trigger point has occurred;

receive a second digital profile of the room upon an occurrence of the trigger point; and compare the second digital profile with the electronic model room profile to determine whether a second trigger point has occurred.

19. The non-transitory machine-readable storage medium of claim 15, wherein the instructions, when executed, further cause the processor to transmit audio to be broadcast in the room, wherein the audio comprises instructions for replacing items or rearranging the items in the room in order to conform to the electronic model room profile.

20. The non-transitory machine-readable storage medium of claim 15, wherein the instructions, when executed, further cause the processor to determine whether the replacement items or the rearrangement of the items are needed in the room based on the meeting status.

* * * * *